(12) United States Patent
Kim et al.

(10) Patent No.: US 8,213,372 B2
(45) Date of Patent: Jul. 3, 2012

(54) METHOD FOR TRANSMITTING CONTROL INFORMATION

(75) Inventors: So Yeon Kim, Gyeonggi-do (KR); Min Seok Oh, Gyeonggi-do (KR); Ki Hyoung Cho, Gyeonggi-do (KR); Seung Hyun Kang, Gyeonggi-do (KR); Ji Ae Seok, Gyeonggi-do (KR); Ji Wook Chung, Gyeonggi-do (KR); Young Seob Lee, Gyeonggi-do (KP)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 12/596,981

(22) PCT Filed: May 13, 2008

(86) PCT No.: PCT/KR2008/002654
§ 371 (c)(1),
(2), (4) Date: Oct. 21, 2009

(87) PCT Pub. No.: WO2008/147059
PCT Pub. Date: Dec. 4, 2008

(65) Prior Publication Data
US 2010/0278106 A1    Nov. 4, 2010

(30) Foreign Application Priority Data
May 29, 2007 (KR) .................. 10-2007-0051930

(51) Int. Cl.
*H04W 4/00* (2009.01)

(52) U.S. Cl. ........................................................ 370/329
(58) Field of Classification Search .................. None
See application file for complete search history.

(56) References Cited

U.S. PATENT DOCUMENTS

| | | | |
|---|---|---|---|
| 6,205,129 B1 | 3/2001 | Esteves et al. | |
| 6,798,791 B1 | 9/2004 | Riazi et al. | |
| 7,853,205 B2* | 12/2010 | Papasakellariou | 455/23 |
| 2007/0211667 A1* | 9/2007 | Agrawal et al. | 370/335 |
| 2007/0242636 A1* | 10/2007 | Kashima et al. | 370/329 |
| 2008/0095071 A1* | 4/2008 | Lu et al. | 370/254 |
| 2008/0187005 A1* | 8/2008 | Chauviere et al. | 370/480 |
| 2008/0228878 A1* | 9/2008 | Wu et al. | 709/205 |
| 2009/0257382 A1* | 10/2009 | Qi et al. | 370/329 |
| 2009/0262699 A1* | 10/2009 | Wengerter et al. | 370/330 |
| 2012/0057542 A1* | 3/2012 | Li et al. | 370/329 |

* cited by examiner

*Primary Examiner* — Anh-Vu Ly
(74) *Attorney, Agent, or Firm* — Lee, Hong, Degerman, Kang & Waimey

(57) ABSTRACT

A method for receiving control information for data reception at a specific user equipment in a communication system in which at least one data transmission mode is used to transmit data of the at least one UE is disclosed. The method receives the control information including a first field and a second field, in which the first field indicates a data transmission mode of the specific user equipment (UE) and the second field indicates a resource block via which the data is transmitted, and receives the data by decoding the control information. As a result, a method for constructing control information required for receiving control data of a localized-mode UE and a distributed-mode UE can be recognized.

7 Claims, 16 Drawing Sheets

FIG. 4
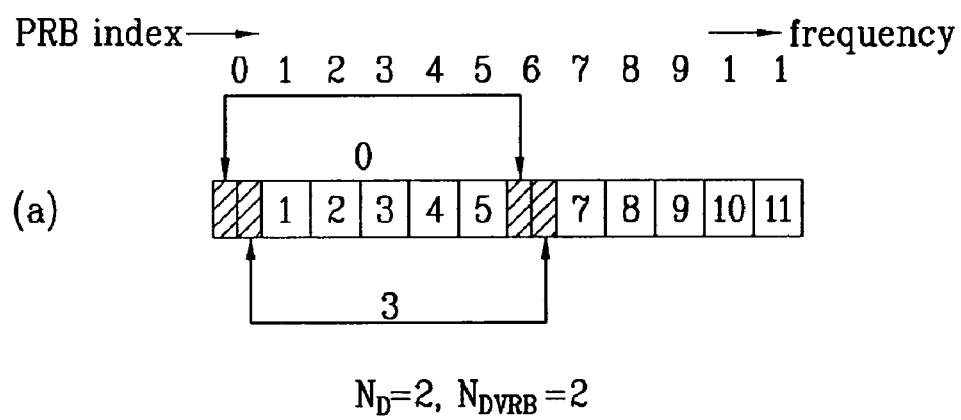
$N_D=2$, $N_{DVRB}=2$
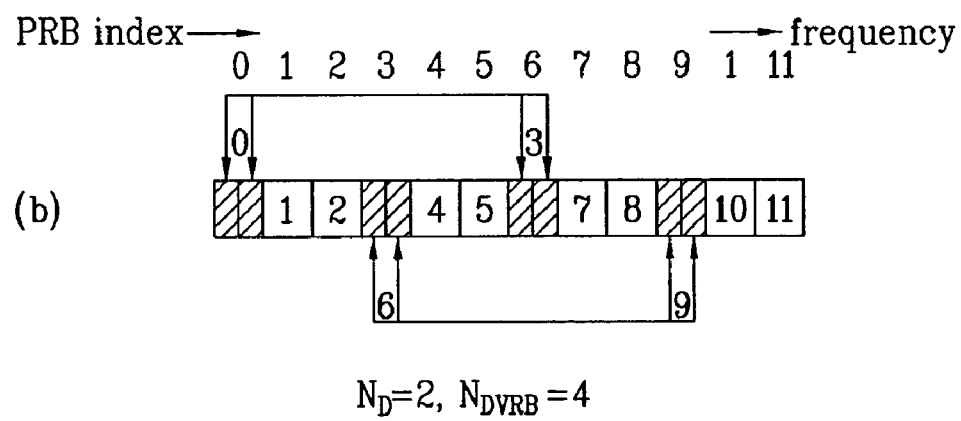
$N_D=2$, $N_{DVRB}=4$

FIG. 5

(a) | L or D | AD | DUE order | RA | $N_D$ | Cat.2 | Cat.3 | CRC |

(b) | L | AD | RA | Cat.2 | Cat.3 | CRC |

(c) | D | AD | DUE order | RA | Cat.2 | Cat.3 | CRC |

(d) | D | AD | DUE order | $N_D$ | RA | Cat.2 | Cat.3 | CRC |

FIG. 7

(a) | L or D | AD | DUE order | RA | DSI | Cat.2 | Cat.3 | CRC |

(b) | L | AD | RA | Cat.2 | Cat.3 | CRC |

(c) | D | AD | DSI | RA | Cat.2 | Cat.3 | CRC |

FIG. 10

(a) | L or D | AD | RA | N | k | Cat.2 | Cat.3 | CRC |

(b) | D | AD | N | k | Cat.2 | Cat.3 | CRC |

(c) | L | AD | RA | N | $k_1$ | $k_2$ | ... | $k_{DUE}$ | Cat.2 | Cat.3 | CRC |

FIG. 11

(a) | L or D | AD | RA | Cat.2 | Cat.3 | CRC |

(b) | D | AD | Cat.2 | Cat.3 | CRC |

(c) | L | AD | RA | Cat.2 | Cat.3 | CRC |

(a) | L or D | AD | RA | DSI | Cat.2 | Cat.3 | CRC |

(b) | D | AD | S.I | Cat.2 | Cat.3 | CRC |

(c) | L | AD | RA | $N_{DUE}$ | DSI | Cat.2 | Cat.3 | CRC |

FIG. 14

(a) | UE1 ID | AD | UE2 ID | AD | ... | UEN ID | AD | UE1 RA | UE2 RA | ... | UEN RA |

(b) | UE1 Cat. 1 | UE1 Cat.2/3 | UE2 Cat. 1 | UE2 Cat.2/3 | ... | UEN Cat. 1 | UEN Cat.2/3 |

(c) | UE1 Cat. 1 | UE2 Cat. 1 | ... | UEN Cat. 1 | UE1 Cat.2/3 | UE2 Cat.2/3 | ... | UEN Cat.2/3 |

METHOD FOR TRANSMITTING CONTROL INFORMATION

CROSS-REFERENCE TO RELATED APPLICATIONS

This application is the National stage filing under 35 U.S.C. 371 of International Application No. PCT/KR2008/002654, filed May 13, 2008, which claims the priority of Korean patent application No. 10-2007-0051930, filed May 29, 2007.

TECHNICAL FIELD

The present invention relates to a method for transmitting control information, and more particularly to a method for transmitting control information in a mobile communication system.

BACKGROUND ART

There are two downlink transmission modes for use in an orthogonal frequency division multiple access (OFDMA) system, i.e., a localized resource allocation mode and a distributed resource allocation mode.

The localized resource allocation mode allocates resources in the form of a gathered format on time and frequency axes in order to make easier channel estimation. The distributed resource allocation mode aims to increase time- and frequency-diversities, allocates resources in the form of a distributed format on time and frequency axes.

Using the above-mentioned localized and distributed resource allocation modes can increase the number of utilities of radio resources, so that the radio resources can be more effectively used by the above-mentioned localized and distributed resource allocation modes.

The localized resource allocation mode allocates resources in the form of a gathered format on time and frequency axes, thereby making easier channel estimation. In more detail, transmission (Tx) information of a predetermined number of terminals or UEs (User Equipments) is transmitted via a predetermined number of resource blocks (RBs).

In this case, the resource block (RB) is indicative of a collection unit of a predetermined number of OFDM symbols. In the case of the RBs of the frequency domain, a predetermined number of sub-carriers on the basis of a frequency-resource allocation unit of OFDM symbols configure a single resource block (RB). For example, according to the 3GPP LTE scheme, 12 sub-carriers configure a single RB. According to the 3GPP2 scheme, 16 sub-carriers configure a single RB.

The localized resource allocation mode transmits data of a predetermined UE using at least one RB, so that strong cross-correlation characteristics of the frequency selective fading exists between sub-carriers contained in a predetermined RB. The localized resource allocation mode performs frequency-domain scheduling based on an Adaptive Modulation and Coding (AMC) scheme using the aforementioned storing cross-correlation characteristics, such that it can be more effectively applied to low-speed or medium-speed UEs, each of which can acquire a multi-user diversity gain.

In order to increase frequency and time diversities, the distributed resource allocation mode allocates resources in the form of a distributed format on time and frequency axes, such that a predetermined amount of information corresponding to a single RB from among transmission (Tx) information of a predetermined UE is distributed over all frequency-domain resources.

From the viewpoint of either a high-speed UE having difficulty in expecting a multi-user diversity gain or a signaling overhead, the distributed resource allocation mode distributes transmission symbols, which are associated with undesirable-scheduling UEs and channels incapable of controlling the AMC control, to several frequency domains, such that it provides a frequency diversity gain related to the frequency selective fading.

The distributed resource allocation mode is classified into a frequency division multiplexing (FDM) scheme and a time division multiplexing (TDM) scheme according to distributed resource allocation categories of time-frequency resources for a frequency diversity gain.

Two methods for transmitting data of UEs for the distributed resource allocation have been used, i.e., a resource block level (RB-level) method and a sub-carrier level (SC-level) method. The RB-level method allocates transmission resources to individual RBs in different ways according to the localized resource allocation mode and the distributed resource allocation mode. The SC-level method performs puncturing data allocated by the localized resource allocation mode, and transmits data of UEs for the distributed resource allocation mode (hereinafter referred to as distributed-mode UEs).

If the localized-mode UEs and the distributed-mode UEs are mixed in an OFDMA downlink, a Node-B or base station (BS) must transmit suitable control information to several UEs, such that resources for data transmission are distributed to the UEs. A detailed control information structure and a control-information transmission method capable of supporting the multiplexing are not defined in a current OFDMA downlink. General or conventional control information cannot support data reception of the localized-mode UEs or the RB-level or SC-level multiplexed distributed-mode UEs.

DISCLOSURE

Technical Problem

Accordingly, the present invention is directed to a method for transmitting control information that substantially obviates one or more problems due to limitations and disadvantages of the related art.

An object of the present invention is to provide a method for more effectively transmitting/receiving control information as compared to the above-mentioned conventional art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for receiving control information for data reception at a specific user equipment (UE) in a mobile communication system comprising: receiving the control information including a first field and a second field, the first field indicating a data transmission mode of the specific user equipment (UE) and the second field indicating a resource block via which the data is transmitted; and receiving the data using the control information, wherein the mobile communication system uses at least one data transmission mode for transmitting data of at least one user equipment (UE), and the data transmission mode includes a localized mode and a distributed mode.

If the data transmission mode for the specific user equipment (UE) is the localized mode, data may be received using the second field.

If the data transmission mode for the specific user equipment (UE) is the distributed mode, the data is transmitted using at least one of a resource block (RB)-level frequency division multiplexing (FDM) scheme, a RB-level time division multiplexing (TDM) scheme, and a sub-carrier (SC)-level multiplexing scheme.

If data for the specific user equipment (UE) is transmitted according to the RB-level frequency division multiplexing (FDM) scheme, a distributed-mode resource block (RB) may include at least one sub-block, the control information may further include a third field capable of checking the sub-block, and the data may be received using the second and third fields.

The third field may include order information for the specific user equipment (UE) of all user equipments (UEs) in the distributed mode contained in a single transmission unit, and the sub-block may be confirmed by the order information.

If data for the specific user equipment (UE) is transmitted according to the RB-level time division multiplexing (TDM) scheme, the control information may further include a third field including a distributed-allocation pattern based on a time division multiplexing (TDM) scheme, and the data may be received using the second and third fields.

if data for the specific user equipment (UE) is transmitted according to the sub-carrier (SC)-level multiplexing scheme, If the data transmission mode for the specific user equipment (UE) is the localized mode, the control information may further include a third field including puncturing pattern information used by all user equipments (UEs) in the distributed mode, and the data may be received using the second and third fields; and if the data transmission mode for the specific user equipment (UE) is the distributed mode, the control information may further include a fourth field including puncturing pattern information used by the specific user equipment (UE), and the data may be received using the second and fourth fields.

In another aspect of the present invention, there is provided a method for receiving control information for data reception at a specific user equipment (UE) in a communication system which is capable of using at least one data transmission mode to transmit data of at least one user equipment (UE), the method comprising: checking a data transmission mode contained in the control information; if the data transmission mode is a localized mode, receiving data via resource blocks instructed in the control information; and if the data transmission mode is a distributed mode, receiving data via resource blocks confirmed by an order of the specific user equipment (UE) among all user equipments in the distributed mode.

In another aspect of the present invention, there is provided a method for enabling a user equipment (UE) to receive control information for data reception in a mobile communication system, the method comprising: receiving control information; determining whether a data transmission mode is a localized mode or a distributed mode on the basis of the control information; if the data transmission mode is the localized mode, checking resource blocks contained in the control information, and receiving data; and if the data transmission mode is the distributed mode, checking a time-distributed-allocation pattern and allocated resource blocks, and receiving data.

In another aspect of the present invention, there is provided a method for receiving control information for data reception in a mobile communication system, the method comprising: receiving control information; determining whether a data transmission mode is a localized mode or a distributed mode based on the control information; if the data transmission mode is a localized mode, receiving data via resource blocks instructed in the control information; and if the data transmission mode is a distributed mode, receiving data via resource blocks confirmed by time-distributed-allocation pattern.

In another aspect of the present invention, there is provided a method for receiving control information for data reception at a specific user equipment (UE) in a mobile communication system, the method comprising: receiving control information; determining whether a data transmission mode is a localized mode or a distributed mode based on the control information; if the data transmission mode is the localized mode, receiving data via resource blocks confirmed by at least one puncturing pattern information for all user equipments (UEs) in a distributed mode; and if the data transmission mode is the distributed mode, receiving data via resource blocks confirmed by puncturing pattern information of the specific user equipment (UE).

If a plurality of sub-carriers contained in a single transmission unit is divided into at least one group, the puncturing pattern information may include a total number of the groups and a group index for each user equipment (UE) in the distributed mode.

It is to be understood that both the foregoing general description and the following detailed description of the present invention are exemplary and explanatory and are intended to provide further explanation of the invention as claimed.

Advantageous Effects

The present invention can effectively transmit control information of the localized-mode UEs or the distributed-mode UEs.

The above-mentioned control information of the localized-mode UEs and the distributed-mode UEs can be configured by a joint-coding scheme and a separate-coding scheme.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a conceptual diagram illustrating a data transmission scheme of an RB-level distribution mode of a frequency division multiplexing (FDM) scheme according to the present invention;

FIG. 5 is a structural diagram of control information according to one embodiment of the present invention;

FIG. 7 is a structural diagram of control information according to another embodiment of the present invention;

FIG. 10 is a structural diagram of control information according to another embodiment of the present invention;

FIG. 11 is a structural diagram of control information according to another embodiment of the present invention;

FIG. 14 shows an example of the joint-coding scheme according to the present invention;

BEST MODE

Figures 1, 2:
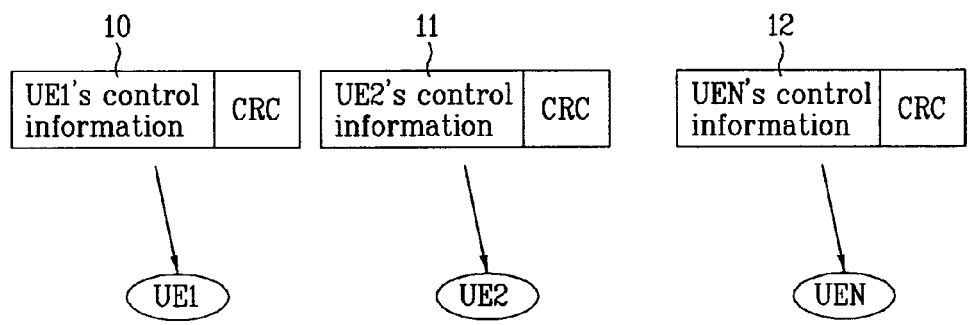
FIG. 1 is a conceptual diagram illustrating a separate-coding scheme according to the present invention.
FIG. 2 exemplarily shows a separate-coding scheme according to the present invention.

Reference will now be made in detail to the preferred embodiments of the present invention, examples of which are illustrated in the accompanying drawings. Wherever possible, the same reference numbers will be used throughout the drawings to refer to the same or like parts.

Control information is transmitted to allow a user equipment (UE) to receive and decode data and other data allocated to the UE itself. Downlink control information of the OFDMA system includes scheduling information related to uplink/downlink data transmission, ACK/NACK information related to uplink transmission, and a scheduling grant related to the uplink transmission. The above-mentioned scheduling information related to the downlink data transmission indicates a method for processing downlink data using the UE. The above-mentioned scheduling information related to the downlink data transmission can be classified into three categories.

The above-mentioned scheduling information from among the control information is shown in the following Table 1:

TABLE 1

| | Field | | Comment |
|---|---|---|---|
| Cat. 1 (Resource Indication) | ID (UE or group specific) | | Indicates the UE (or group of UEs) for which the data transmission is intended. |

TABLE 1-continued

| | Field | | Comment |
|---|---|---|---|
| | Resource assignment | | Indicates which (virtual) resource units (and layers in case of multi-layer transmission) the UE(s) shall demodulate. |
| | Duration of assignment | | The duration for which the assignment is valid, could also be used to control the TTI or persistent scheduling. |
| Cat. 2 (Transport format) | Multi-antenna related information | | Content depends on the MIMO/beamforming schemes selected |
| | Modulation scheme | | QPSK, 16QAM, 64QAM. In case of multi-layer transmission, multiple instances may be required. |
| | Payload size | | Interpretation could depend on e.g. modulation scheme and the number of assigned resource units (c.f. HSDPA). In case of multi-layer transmission, multiple instances may be required. |
| Cat. 3 (HARQ) | If asynchronous hybrid ARQ is adopted | Hybrid ARQ process number | Indicates the hybrid ARQ process the current transmission is addressing. |
| | | Redundancy version | To support incremental redundancy. |
| | If synchronous hybrid ARQ is adopted | New data indicator | To handle soft buffer clearing. |
| | | Retransmission sequence number | Used to derive redundancy version (to support incremental redundancy) and new data indicator (to handle soft buffer clearing) |

With reference to the above-mentioned Table 1, a first category is denoted by "Cat.1". The first category (CAT.1) includes a variety of resource indication information indicating allocated resources. For example, the first category (CAT.1) may include an identifier (ID) field, a resource assignment (RA) field, and a duration of assignment (AD) field.

In this case, the ID field indicates identifiers (IDs) for discriminating among individual UEs. Generally, a MAC ID (C-RNTI) of an upper layer may be used as an ID of each UE. Each UE recognizes ID information from among the received control information, and determines whether the received control information is equal to its own control information.

The resource assignment (RA) field indicates which one of resource blocks has been assigned to each UE. The UE checks the received RA, and indicates which one of resources blocks has been used to transmit the UE's data.

The duration of assignment (AD) field indicates which one of periods has been used to transmit control information. The AD field checks the received AD field information, and indicates how many transport time intervals (TTIs) have been used to transmit control information. In this case, the TTI is a transmission unit of data, and is related to the size of a single frame.

A second category is denoted by "Cat.2". The second category (CAT.2) includes a variety of transport format information, for example, a field indicating multi-antenna information, a field indicating modulation-method information, and a field indicating a payload size. In the case of using multiple antennas (i.e., multi-antenna) of individual UEs, the second category (Cat.2) indicates which one of modulation methods (e.g., QPSK, 160QAM, 64QAM, etc.) has been applied to multi-antenna associated information or data, and also indicates the payload size.

A third category is denoted by "Cat.3". The third category (CAT.3) includes HARQ-associated information. For example, in the case of using an asynchronous HARQ, the third category (CAT.3) may include a HARQ process number, a redundancy version, and a new data indicator. In the case of using a synchronous HARQ, the third category (CAT.3) may include a retransmission sequence number. Each UE can recognize data retransmission information of the third category (CAT.3) control information.

There are a variety of methods for transmitting control information of UEs on the condition that data of several UEs is contained in a given bandwidth, for example, a separate-coding scheme and a joint-coding scheme.

Firstly, a method for constructing control information using the separate-coding scheme will hereinafter be described. Although the present invention assumes that control information is scheduling information, it is obvious to those skilled in the art that the term "control information" indicates scheduling information, ACK/NACK information, and a scheduling grant for uplink transmission.

FIG. 1 is a conceptual diagram illustrating a separate-coding scheme according to the present invention.

Referring to FIG. 1, a control information message includes control information of a first UE (UE1), and further includes cyclic redundancy checking (CRC) information, such that the resultant UE1's control information message 10 is transmitted to the first UE (UE1).

Likewise, a control information message 11 of a second UE (UE2) includes only control information of the second UE, and further includes CRC information, such that the resultant UE2's control information is transmitted to the second UE (UE2). The above-mentioned operations can also be equally applied to control information of an n-th UE (UEn).

In other words, the separate-coding scheme configures a control information message using only control information of a single UE, so that the resultant control information message is transmitted to a corresponding UE. Namely, individual UEs receive additional control information messages for every UE. Therefore, in the case of using the separate-coding scheme, each UE can acquire its own control information only.

FIG. 2 exemplarily shows a separate-coding scheme according to the present invention.

FIG. 2 shows exemplary control information based on the separate-coding scheme of FIG. 1. FIG. 2(a) shows exemplary control information of the first UE. The UE1's control information includes first category information associated with the first UE. In other words, as shown in Table 1, the UE1's control information includes ID-, AD-, and RA-information of the first UE, second-category control information of the first UE, third-category control information of the first UE, and CRC information.

FIG. 2(b) shows the UE2's control information, and FIG. 2(c) shows the UEn's control information. Control information descriptions of FIGS. 2(b) and 2(c) is equal to those of FIG. 2(a).

In other words, as shown in FIG. 2, first-category (CAT.1) control information, second-category (CAT.2) control information, and third-category (CAT.3) control information are configured in the form of a single message. FIG. 2 shows a control-information field based on the separate-coding scheme between UEs. In the case of using the separate-coding scheme, each UE receives only control information allocated to the UE itself.

As a result, by the received control information, each UE can recognize which one of resources includes information indicating the UE's data, information of a modulation method, and information of a HARQ execution method. In this case, the separate-coding scheme can be applied to each of the first to third categories (CAT.1~CAT.3) from among control information of individual UEs.

Figure 3:
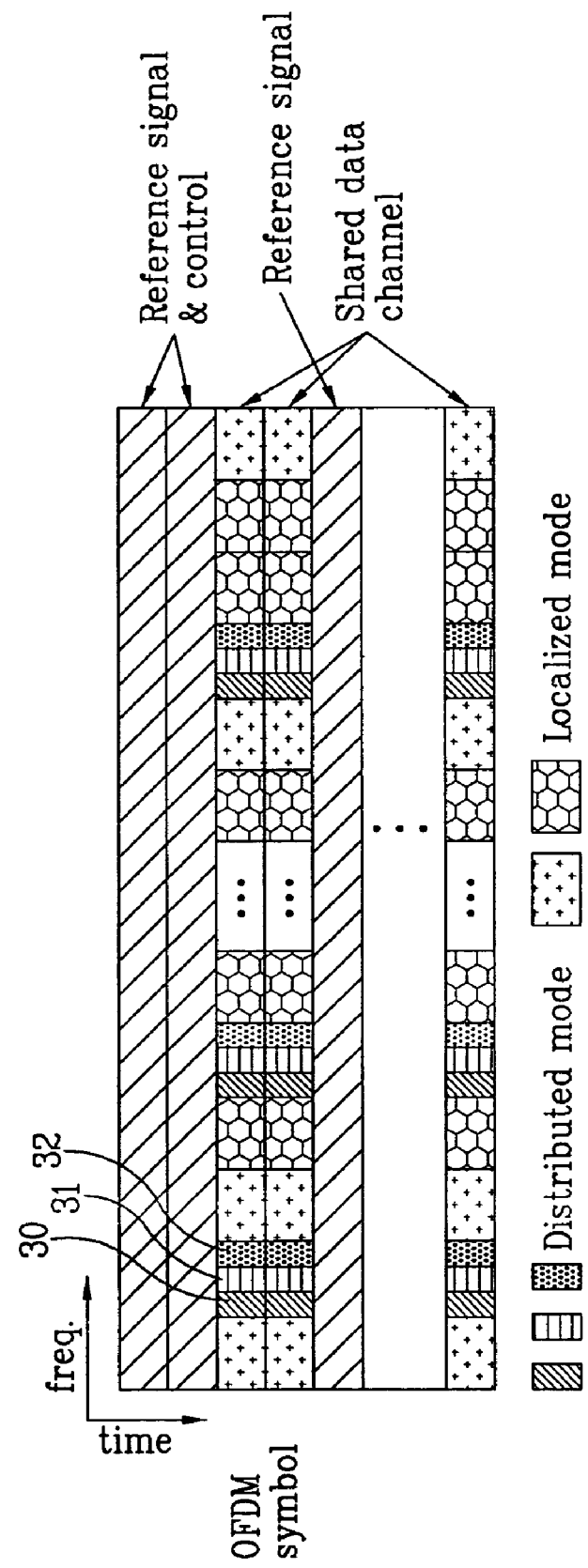
FIG. 3 is a conceptual diagram illustrating a data transmission scheme of an RB-level distribution mode of a frequency division multiplexing (FDM) scheme according to the present invention.

FIG. 3 is a conceptual diagram illustrating a data transmission scheme of an RB-level distribution mode of a frequency division multiplexing (FDM) scheme according to the present invention.

Referring to FIG. 3, the distributed mode performs RB-level multiplexing, and uses the FDM scheme. A predetermined RB to which the FDM-based distributed mode is applied is divided into a predetermined number of sub-blocks, each of which includes a predetermined number of sub-carriers to perform the multiplexing of several UEs. In order to indicate the number of sub-blocks contained in a single RB, a parameter of $N_D$ is used.

FIG. 3 shows resource allocation of distributed-mode UEs in case of $N_D=3$. Namely, in all RBs contained in a single TTI of a shared channel of several UEs, second and fifth RBs from the left side and a fourth RB from the right side are used for a distributed mode, and RB for each distributed mode includes three sub-blocks 30, 31, and 32.

Therefore, if the number of UEs employing the distributed mode is equal to the number of sub-blocks contained in a single distributed mode, the resource allocation of FIG. 3 can enable a single sub-block to be allocated to a single UE.

In other words, it is assumed that the first UE, the second UE, and the third UE receive data using the distributed mode. In this case, a first sub-block 30 of the RB of each distributed mode is used by the first UE, a second sub-block 31 of the RB of each distributed mode is used by the second UE, and a third sub-block 32 of the RN of each distributed mode is used by the third UE. And, the remaining RBs other than the distributed-mode RB from among all RBs of the shared channel of several UEs can be used for the localized mode. If a specific UE receives a localized-mode RB, this UE can receive data using all the sub-carriers contained in the localized-mode RB.

FIG. 4 is a conceptual diagram illustrating a data transmission scheme of an RB-level distribution mode of a frequency division multiplexing (FDM) scheme according to the present invention.

If the distributed-mode UE is multiplexed in a single OFDM symbol of a given bandwidth, FIG. 4 shows a conceptual diagram illustrating a method for allocating each UE's data to the RB.

In FIG. 4, $N_D$ is the number of sub-carrier groups contained in a single distributed-mode RB, i.e., $N_D$ is the number of sub-blocks. Therefore, data of each distributed-mode UE can be allocated to the $N_D$ number of sub-blocks. In FIG. 4, $N_{DVRB}$ is the number of UEs, each of which uses the distributed mode.

FIG. 4(a) shows an example of the case denoted by $N_D=N_{DVRB}$, and FIG. 4(b) shows an example of the other case denoted by $N_D \neq N_{DVRB}$. In FIG. 4(a), the number of sub-blocks contained in the distributed-mode RB is equal to the number of distributed-mode UEs.

As can be seen from FIG. 4(a), it is assumed that the RB having a physical resource block (PRB) index "0" and the other RB having a PRB index "6" are used as the distributed-mode RBs, respectively. Each distributed-mode RB includes two sub-blocks (i.e., $N_D=2$). It is assumed that the number of UEs each of which uses the distributed-mode RB is equal to "2" (i.e., $N_{DVRB}=2$). Namely, it is assumed that the first UE and the second UE receive data under the distributed mode.

The localized-mode UE does not share the RB, to which the UE's data has been allocated, with other UEs. Provided that the localized-mode UE determines which one of RBs receives data contained in the UE's control information, it can receive data.

However, the distributed-mode UE can share a single RB with other UEs, each of which uses $N_D-1$ number of different distributed modes. In this case, $N_D-1$ is the number of remaining distributed-mode UEs other than the above distributed-mode UE from among all distributed-mode UEs. As a result, in a single RB composed of $N_D$ number of sub-blocks, the above UE must recognize which one of sub-blocks includes the UE's data in order to correctly receive data.

The location of any sub-block used by the above UE can be determined by the method of FIG. 4(a) based on a specific method for determining location information of each UE in the $N_D$ number of sub-blocks. In other words, the order of distributed-mode UEs is determined, and a system is able to use a method for employing the sub-block contained in each distributed-mode RB according to the determined order.

In more detail, if the first UE and the second UE are sequentially arranged, a first sub-block contained in each distributed-mode RB receives data using the first UE. And, a second sub-block contained in each distributed-mode RB receives data using the second UE. For example, provided that each UE recognizes its order information related to all the distributed-mode UEs, the UE can recognize which one of sub-blocks contained in each distributed-mode UE will be related to reception (Rx) data.

The other case of $N_D \neq N_{DVRB}$ will hereinafter be described with reference to FIG. 4B. In this case, $N_D$ is the number of sub-blocks contained in the distributed-mode RB, and $N_{DVRB}$ is the number of UEs, each of which uses the distributed mode.

As can be seen from FIG. 4(b), it is assumed that a specific RB having PRB indexes 0, 3, 6, and 9 is used as a distributed-mode RB. Each distributed-mode RB includes two sub-blocks (i.e, $N_D=2$). However, in FIG. 4(b), it is assumed that the number of distributed-mode UEs is 4 ($N_{DVRB}=4$), differently from FIG. 4(a), such that the number of sub-blocks contained in each distributed-mode RB is different from the number of distributed-mode UEs. In more detail, in FIG. 4(b), it is assumed that a first UE, a second UE, a third UE, and a fourth UE receive data under the distributed mode.

In the same manner as in FIG. 4(a), although the localized-mode UEs receive only the RB information, they are able to receive data. However, the distributed-mode UEs distribute sub-carriers contained in an allocated RB to several UEs, so that they must receive control information of sub-carriers of each UE contained in the RB in order to correctly receive data. Therefore, if a single distributed-mode RB includes several sub-blocks, it is preferable that each UE may recognize control information of the sub-blocks allocated to the distributed-mode UE.

FIG. 4(b) shows a data transmission method on the condition that the number of sub-blocks contained in each distributed-mode RB is higher than the number of distributed-mode UEs. In this case, an amount of Tx data of each UE of FIG. 4(b) is equal to at least two sub-blocks of FIG. 4(a).

A first UE receives data using a first sub-block of the distributed-mode RB having PRB indexes 0 and 6. A second UE receives data using a second sub-block of the distributed-mode RB having PRB indexes 0 and 6. A third UE receives data using a first sub-block of the distributed-mode RB having PRB indexes 3 and 9. Finally, a fourth UE receives data using a second sub-block of the distributed-mode RB having PRB indexes 3 and 9.

In this way, the above-mentioned method for allocating sub-blocks contained in the distributed-mode RB to the distributed-mode UE has been disclosed for only illustrative purposes, and it is obvious to those skilled in the art that the allocated sub-blocks can be configured in the form of various combinations.

FIG. 5 is a structural diagram of control information according to one embodiment of the present invention.

As can be seen from FIG. 5(a), the distributed-mode RB for data transmission is multiplexed according to the RB-level FDM scheme in the same manner as in FIG. 3, and FIG. 5(a) shows a general control information field when each UE's control information is transmitted according to the separate-coding scheme.

As can be seen from FIG. 5(a), provided that each UE's control information is transmitted according to the separate-coding scheme, and the distributed mode is transmitted according to the RB-level transmission scheme, each UE's control information includes first category (CAT.1) information shown in Table 1. In more detail, each UE's control information includes indicator (L or D) information composed of 1 bit indicating whether a UE is a localized or distributed mode, AD information indicating the assignment duration, and RA (Resource Assignment) information indicating which one of resources includes UE's data.

In addition, each UE's control information includes DUE order information and $N_D$ information. The DUE order information indicates the order of a corresponding UE in the multiplexed distributed-mode UEs. The $N_D$ information indicates the number of blocks divided by a single RB. The above UE's control information further includes second category (CAT.2) information associated with the transmission format of Table 1, third category (CAT.3) information associated with the HARQ, and CRC information by which an Rx UE can determine whether control information has been correctly received in the Rx UE itself.

The control information shown in FIG. 5(a) can be applied to both the localized mode and the distributed mode, irrespective of a distinction in mode. In the case of the localized-mode UE, the DUE order or $N_D$ information unnecessary for the control information of FIG. 5(a) may be transmitted with the value of "0".

Individual fields of control information will hereinafter be described. By the indicator field (L or D) of FIG. 5(a), the UE can determine whether control information relates to the localized mode or the distributed mode. In the case of using different control information structures according to the localized and distributed modes, a structure or length of control information is changed according to UE's transmission (Tx) modes, as shown in FIGS. 5(b)~5(d), such that the indication field indicating the UE's transmission mode must be located at the head of control information.

If the indication field is not located at the head of control information, a system is unable to recognize a UE's transmission mode and is unable to recognize the presence or absence of DUE order information, such that the system cannot recognize a beginning position of the RA field indicating assignment information of UE's data. Therefore, it is preferable that the indication field indicating a Tx mode of the above UE be located at the beginning part of each control information.

The UE, which has received control information of FIG. 5(a), can recognize whether data transmitted to the UE itself relates to the localized mode or the distributed mode. For example, provided that the localized mode is decided when information of "0" is transmitted, and the distributed mode is decided when the other information of "1" is transmitted, the localized mode is decided when the information of "0" is received, and the distributed mode is decided when the information of "1" is received, such that the above UE can receive data under the decided mode.

In the case of the AD (duration of assignment) field of FIG. 5(a), the UE checks the received AD information, such that it can recognize how many TTIs are used to transmit the UE's control information.

By the resource assignment (RA) field, the UE can recognize which one of resources has been used to transmit the UE's data. In other words, the UE can recognize a location of an RB to be decoded by the UE itself on the basis of the received RA information.

The UE receives the second category (CAT.2) control information of FIG. 5A, such that it recognizes control-format associated control information. As a result, the UE can recognize which one of multi-antennas has been used to transmit the UE's data, which one of modulation methods has been used to transmit the UE's data, and a payload size. And, the UE can recognize HARQ-associated information upon receiving the third category (CAT.3) control information of FIG. 5(a). The UE recognizes the CRC information of FIG. 5(a), such that it determines the presence or absence of errors in the received control information.

As described above, if the indicator information indicates that the UE is in the localized mode, the UE determines which one of periods is used to transmit control information by referring to the AD information, such that it can periodically receive the control information.

The UE recognizes RA information, and determines which one of RBs has been used to transmit data transmitted to the UE itself on the basis of the RA information, thereby receiving data via a corresponding RB. Otherwise, if the indicator information indicates that a UE is in the distributed mode, this UE determines the AD and RB information in the same manner as in the localized-mode UE. However, the distributed-mode UE does not use the entire part of each of at least one RB, and can share each RB with other distributed-mode UEs, so that it requires additional information.

In other words, as described above, this embodiment of the present invention uses a structure including DUE order information and $N_D$ information. The distributed-mode UE checks DUE order information, such that it can recognize the order of the distributed-mode UE in the distributed-mode UEs. And, the distributed-mode UE checks the $N_D$ information, such that it can recognize the number of sub-blocks divided by a single distributed-mode RB.

Next, the aforementioned DUE order information and $N_D$ information indicate which one of sub-blocks contained in the distributed-mode RB has been used in the distributed-mode UE, and associated detailed descriptions will hereinafter be described in detail.

If the number of sub-blocks contained in a single distributed-mode RB is equal to the number of distributed-mode UEs while distributed-mode UE data is allocated to sub-blocks, the above distributed-mode UE data is sequentially allocated to the sub-blocks according to the order of distributed-mode UEs. For example, there are a total of 3 distributed-mode UEs.

In other words, it is assumed that the first UE, the second UE, and the third UE are in the distributed mode, and a single RB includes 3 sub-blocks. In this case, if the above distributed-mode UE data is sequentially allocated to the sub-block according to the order of distributed-mode UEs, data of the first UE (i.e., UE1's data) is transmitted via a first sub-block contained in each distributed-mode RB. Data of the second UE (i.e., UE2's data) is transmitted via a second sub-block contained in each distributed-mode RB. Finally, data of the third UE (i.e., UE3's data) is transmitted via a third sub-block contained in each distributed-mode RB. In this case, the present invention can check the sub-block via which data is transmitted without the $N_D$ information.

If the number of sub-blocks contained in a single distributed-mode RB is different from the number of distributed-mode UEs while distributed-mode UE data is allocated to sub-blocks, the above distributed-mode UE data is sequentially allocated to the sub-blocks according to the order of distributed-mode UEs. In this case, it is expected that many more distributed-mode RBs will be used, and the sub-blocks contained in at least two distributed-mode RBs will be used as a single unit.

For example, there are a total of 4 distributed-mode UEs. In other words, it is assumed that the first UE, the second UE, the third UE, and the fourth UE are in the distributed mode, and a single RB includes 2 sub-blocks. In this case, a total of 4 distributed-mode RBs are used, two distributed-mode RBs are used for the first and second UEs, and the remaining two distributed-mode RBs are used for the third and fourth UEs.

As described above, if the distributed-mode UE data is sequentially allocated to the sub-blocks according to the order of distributed-mode UEs, data of the first UE (i.e., UE1's data) is transmitted via a first sub-block contained in each distributed-mode RB from among two distributed-mode RBs used for the first and second UEs. And, data of the second UE (i.e., UE2's data) is transmitted via a second sub-block contained in each distributed-mode RB from among two distributed-mode RBs used for the first and second UEs. Data of the third UE (i.e., UE3's data) is transmitted via a first sub-block contained in each distributed-mode RB from among the remaining two distributed-mode RBs used for the third and fourth UEs. Data of the fourth UE (i.e., UE4's data) is transmitted via a second sub-block contained in each distributed-mode RB from among the remaining two distributed-mode RBs used for the third and fourth UEs.

If data of the distributed-mode UE is allocated using the above-mentioned method, the distributed-mode UE receives control information of FIG. 5(a) to check a corresponding RB, and then checks the DUE order information and the $N_D$ information. If the number of sub-blocks contained in a single distributed-mode RB is equal to the number of distributed-mode UEs, the present invention can receive data via the sub-block corresponding to the DUE order information.

If the number of sub-blocks contained in a single distributed-mode RB is different from the number of distributed-mode UEs, the present invention performs a modulo-operation on both the number of sub-blocks contained in a single distributed-mode RB and the DUE order information, such that it can receive data via the sub-block corresponding to the modulo-resultant value. Namely, the distributed-mode UE can receive data via the sub-block corresponding to the resultant value of the above modulo-operation denoted by (DUE order mod $N_D$).

For example, if a total number of distributed-mode UEs is 4 and the number of sub-blocks contained in each distributed-mode RB is 2, the first UE (UE1) can receive data via a first sub-block according to the result "1" of the modulo-operation (1 mod 2). The second UE (UE2) can receive data via a second sub-block according to the result "0" of the modulo-operation (2 mod 2). The third UE (UE3) can receive data via the first sub-block according to the result "1" of the modulo-operation (3 mod 2). Finally, the fourth UE (UE4) can receive data via the second sub-block according to the result "0" of the modulo-operation (4 mod 2).

For another example, the DUE order information is not defined as the order information of a corresponding UE from among all the distributed-mode UEs, but is defined as information indicating a data-transmission sub-block contained in the RB confirmed by control information. In this case, the above-mentioned example shows that the number of sub-blocks contained in a single distributed-mode RB is equal to the number of distributed-mode UEs, but it should be noted that the above-mentioned example can also be applied to the other case in which the number of sub-blocks contained in a single distributed-mode RB is different from the number of distributed-mode UEs.

In other words, the present invention recognizes the RB for data reception on the basis of RB information, and recognizes the sub-block contained in a corresponding RB on the basis of the DUE order information such that it can receive data. Needless to say, the present invention can recognize the sub-block for data transmission without using $N_D$ information.

The above-mentioned scheme of FIG. 5(a) can equally apply the same control information structure to both the localized mode and the distributed mode, irrespective of a distinction between the localized mode and the distributed mode. However, it should be noted that different control information structures may also be used according to individual cases. In the case of using different control information structures according to the individual cases, there is no need to transmit unnecessary control information.

In other words, only information required for the individual cases can be transmitted, resulting in the reduction of signaling overhead. FIGS. 5(b)~5(d) exemplarily show different control information structures of individual cases.

FIG. 5(b) shows a control-information field transmitted to the localized-mode UE under the above situation of FIG. 5(a). In FIG. 5(b), control information of individual UEs is transmitted according to the separate-coding scheme, such that there is no need to independently transmit ID information for each UE. The UE receiving the control information recognizes a tacit ID which has been tacitly transmitted according to the CRC masking scheme, and determines whether the received control information belongs to the UE itself. In this case, a single UE can use all parts of a single RB, such that the localized-mode UE can receive data without transmitting additional control information other than the RB information.

FIGS. 5(c) and 3(d) show a control-information field transmitted to the distributed-mode UE under the above situation of FIG. 5(a).

In more detail, FIG. 5(c) shows sub-block allocation for the distributed-mode UE. During the sub-block allocation time, a control information field of FIG. 5(c) can be used when the number of sub-blocks contained in a single distributed-mode RB is equal to the number of distributed-mode UEs. For the convenience of description and better understanding of the present invention, the parts of FIG. 5(a) will herein be omitted, and only a difference between the scheme of FIG. 5(a) and the other scheme of FIG. 5(c) will hereinafter be described in detail.

As described above, $N_D$ is a parameter indicating a total number of sub-blocks divided by a single distributed-mode RB, and the distributed-mode UE can allocate its own data to $N_D$ number of blocks. And, $N_{DVRB}$ is the number of UEs, each of which uses the distributed mode. If the equation of $N_D = N_{DVRB}$ is provided, data of a specific UE, which has used $N_{DVRB}$ number of all the distributed-mode UEs in a single RB divided into $N_D$ number of sub-blocks, is transmitted using a single sub-block.

Therefore, although the $N_D$ information is not additionally transmitted, the above UE receives the DUE order field, such that it can recognize which one of sub-blocks contained in a single distributed-mode RB will be used to receive data on the basis of the above DUE order field.

In other words, the DUE order field indicates which one of blocks from among the $N_D$ number of blocks $(1, 2, \ldots, N_D)$ of a single RB will receive the UE's data. Based on the above-mentioned DUE order information, a corresponding UE can recognize the order of the UE itself in several scheduled-distributed-mode UEs during a single TTI, and can recognize that the UE's data has been allocated to the sub-block corresponding to the DUE order from among the $N_D$ number of blocks of the distributed-mode RB. The above UE confirms the RA field, and at the same time recognize allocation position information of the UE's data, such that it is preferable that the DUE order be located in front of the RA field.

By the RA field, the UE can recognize which one of resources has been used to transmit the UE's data. The UE receives the RA field information and the DUE order information, and recognizes location information of the UE's data contained in radio resources (i.e., a corresponding RB) on the basis of the RA field information and the DUE order information. In this case, the RA field information indicates which one of RBs is used to allocate the UE's data, and the DUE order information is checked at a time earlier than the RA reception time.

In more detail, FIG. 5(d) shows a control-information field which can be used when the number of sub-blocks contained in a single distributed-mode RB is different from the number of distributed-mode UEs. If the number of sub-blocks contained in a single distributed-mode RB is different from the number of distributed-mode UEs, $N_{DVRB}$ number of distributed-mode UE data units cannot be allocated to the single RB on a one-to-one basis, as previously stated in FIG. 4(b).

Therefore, compared with FIG. 5(c), FIG. 5(d) further includes $N_D$ information. Provided that the number of sub-blocks contained in a single distributed-mode RB is different from the number of distributed-mode UEs, a corresponding UE which has already recognized RB information needs to recognize which one of sub-blocks contained in the RB is used for data transmission, so that the corresponding UE can receive data.

In more detail, if the $N_D$ field indicates $N_D \neq N_{DVRB}$, the $N_{DVRB}$ number of all distributed-mode UE data units cannot be allocated to one of the $N_D$ number of division RBs on a one-to-one basis as shown in FIG. 4(b), such that $N_D$ information must be transmitted to control information. As a result, information associated the allocation of UE's data can be correctly decoded. The RA field associated the UE's data allocation exists, but the contents of the RA part indicate which one of RBs will be used by a corresponding UE.

The present invention requires $N_D$ information, so that the UE can recognize which one of sub-carriers (i.e., sub-blocks) contained in a single RB has been used to allocate the UE's data. As result, it is preferable that the DUE order and the $N_D$ information be located in front of the RA field.

The present invention receives the RA field information indicating which one of RBs is used to allocate the UE's data, the DUE order information checked at a time earlier than the RA reception time, and the $N_D$ information, and can recognize where the UE's data is in the radio resources using the received information.

In another embodiment of the present invention, provided that the DUE order is defined as information of a sub-block allocated to a corresponding RB, the structure of FIG. 5C will be used without any distinction between FIG. 5(c) and FIG. 5(d). As described above, FIG. 5(c) shows that the number of sub-blocks contained in a single distributed-mode RB is equal to the number of distributed-mode UEs, and FIG. 5(d) shows that the number of sub-blocks contained in a single distributed-mode RB is different from the number of distributed-mode UEs.

Figure 6:
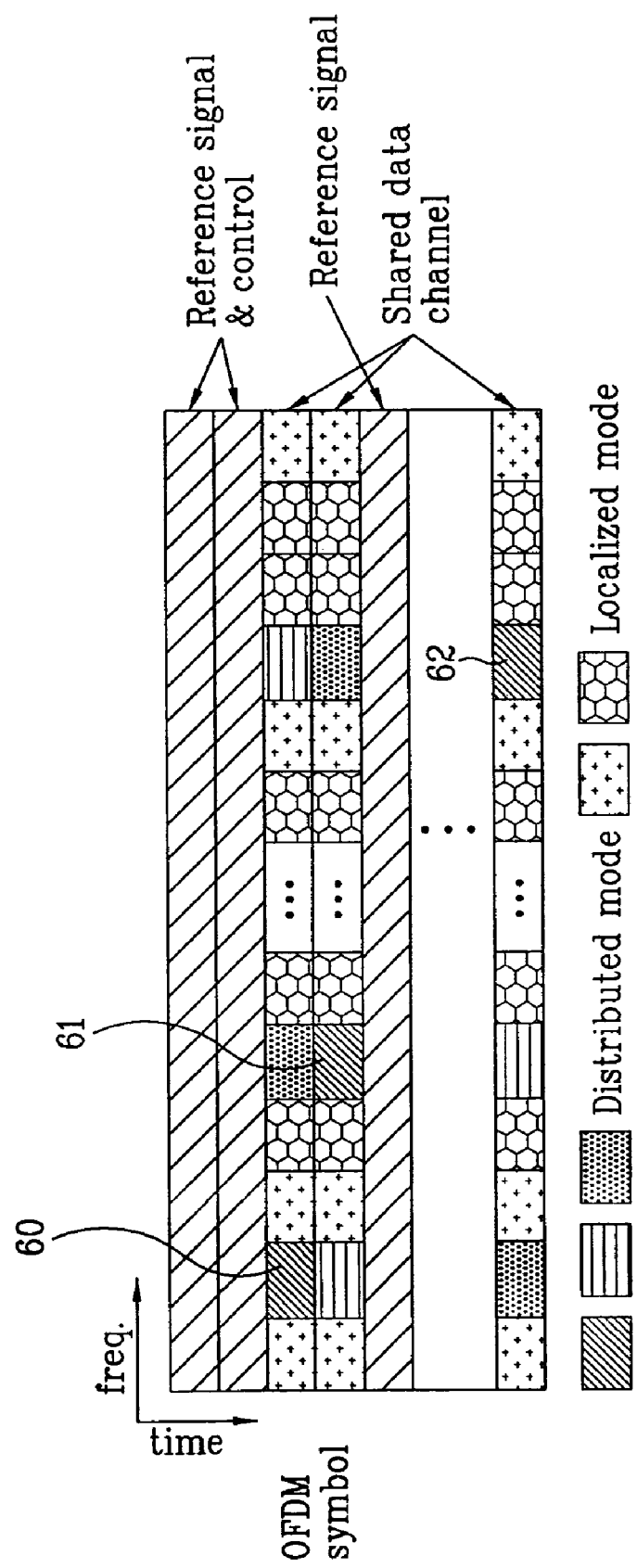
FIG. 6 is a conceptual diagram illustrating a data transmission scheme based on RB-levels of a time division multiplexing (TDM) scheme according to the present invention.

FIG. 6 is a conceptual diagram illustrating a data transmission scheme based on RB-levels of a time division multiplexing (TDM) scheme according to the present invention.

In more detail, FIG. 6 shows the RB-level multiplexing under the distributed mode, and an exemplary method for using the TDM scheme. The resources are distributed to the time axis of the distributed-mode UE. In this case, the scheme of FIG. 6 may perform the distributed allocation to form a predetermined pattern. A single pattern is selected in an orthogonal hopping pattern set well known to the Node-B and the UE, such that the resource allocation of the distributed-mode UE may be executed according to the selected pattern. FIG. 3 shows the distribution allocation method of frequency resources, and FIG. 6 shows the distribution allocation method of time resources. The method of FIG. 3 and the method of FIG. 6 may be used independent of each other, or may also be used at the same time. If the above two multiplexing methods are simultaneously used, the present invention requires additional control information.

FIG. 6 shows resource allocation for three distributed-mode UEs. Referring to FIG. 6, in all RBs contained in a single TTI of a shared channel of several UEs, second and fifth RBs from the left side and a fourth RB from the right side are used for the distributed mode. Each distributed-mode RB uses only some OFDM symbols from among all OFDM symbols contained in a shared data channel according to a predetermined hopping pattern. In this case, this hopping pattern is defined on the basis of either a single OFDM symbol or an OFDM symbol group including one or more OFDM symbols.

For example, as can be seen from FIG. 6, the present invention assumes that N number of UEs are in the distributed mode and the number of OFDM symbols contained in a shared data channel is N. According to a first hopping pattern, in association with the second RB from the left side, the first UE can receive data using a first OFDM symbol 60 from among all OFDM symbols contained in the data channel. According to the first hopping pattern, in association with the fourth RB from the left side, the first UE can receive data using a second OFDM symbol 61 from among all OFDM symbols contained in the data channel. According to the first hopping pattern, in association with the fourth RB from the right side, the first UE can receive data using the last OFDM symbol 62 from among all OFDM symbols contained in the data channel. And, the second to N-th UEs can receive data using the selected OFDM symbols which have been selected by the same method as that of the first UE, without overlapping with the range of the first UE.

The remaining RBs other than the distributed-mode RB from among all RBs of a shared channel of several UEs may be used for the localized mode. The UE receiving the localized-mode RB can receive data using all the sub-carriers contained in the allocated localized-mode RB.

FIG. 7 is a structural diagram of control information according to another embodiment of the present invention.

FIG. 7(a) shows a general control information field. In more detail, provided that the distributed-mode RB for data transmission is multiplexed according to the RB-level TDM scheme shown in FIG. 6, and control information of each UE is transmitted according to the separate-coding scheme, the aforementioned general control information field of FIG. 7(a) is used.

As can be seen from FIG. 7(a), provided that each UE's control information is transmitted according to the separate-coding scheme, and the distributed mode is transmitted according to the RB-level transmission scheme, each UE's control information includes first category (CAT.1) information shown in Table 1.

In more detail, each UE's control information includes indicator (L or D) information composed of 1 bit indicating whether a UE is a localized or distributed mode, AD information indicating the assignment duration, and RA (Resource Assignment) information indicating which one of resources includes UE's data. In addition, each UE's control information includes DUE order information and diversity status indicator (DSI) information. The DUE order information indicates the order of a corresponding UE in the multiplexed distributed-mode UEs. The DSI information indicates information of a hopping pattern used for the multiplexing based on the TDM scheme.

The above UE's control information further includes second category (CAT.2) information associated with the transmission format of Table 1, third category (CAT.3) information associated with the HARQ, and CRC information by which an Rx UE can determine whether control information has been correctly received in the Rx UE itself. The control information shown in FIG. 5(a) can be applied to both the localized mode and the distributed mode, irrespective of a distinction in mode.

Detailed descriptions of individual fields of the control information are almost equal to those of FIG. 5(a), however, it should be noted that a difference between FIG. 7(a) and FIG. 5(a) is the DSI field. A detailed description of the DSI field will hereinafter be described in detail.

Referring to FIG. 7, the DSI field is different from control information under the RB-level FDM scheme. The DSI field includes specific information indicating a distributed-allocation pattern selected when resources are distributed and allocated to the time axis. For example, the UE selects a single puncturing pattern denoted by the DSI from among the orthogonal hopping pattern set well known to both the Node-B and the UE, and performs the distributed-mode UE's resource allocation according to the selected pattern.

The UE receives control information of FIG. 7(a), and determines whether a current mode is the localized mode or the distributed mode on the basis of information of the indication field, such that it can pre-recognize a control information structure corresponding to a total length of control information. If it is determined that the current mode is the localized mode by the indication field, the UE checks the RB for transmitting data via the RA field, such that it can receive data. Otherwise, if it is determined that the current mode is the distributed mode by the indication field, the UE checks the DUE order field and the DSI field before checking the RA field, and recognizes which one of resources contained in each distributed-mode RB has been used to transmit data.

The distributed-mode UE can acquire additional information required for receiving data via the DSI field. In this case, the DSI field is required to indicate an orthogonal distributed-allocation pattern when data of the distributed-mode UE is distributed to the time axis. As shown in the above-mentioned example, the distributed-mode UE selects a pattern indicated by the DSI information from among the orthogonal hopping pattern set well known to the Node-B and the UE, and receives the distributed-allocation data of the distributed-mode UE. Therefore, in the case of using only the RA information indicating which one of RBs includes the UE's data, the UE is unable to decode data of UEs, which are capable of supporting the distributed mode according to the TDM scheme. As a result, it is preferable that DSI information indicating which one of distributed-allocation patterns has been used by the UE may be transmitted to a destination.

If it is determined that a corresponding UE is a distributed-mode UE, the UE is able to recognize that a specific RB to which the UE's data has been allocated may be used by other UEs, and checks the DSI field of control information, such that it can recognize which one of resources contained in the RB is used to transmit the UE's data. Therefore, it is preferable that the DSI field be located in front of the RA field.

Although the localized-mode RB and the distributed-mode RB for transmitting data are multiplexed according to the RB-level TDM scheme, the present invention may also apply different control information to the localized-mode UE and the distributed-mode UE in the same manner as in the above-mentioned FDM scheme, as shown in FIGS. 7(*b*) and 7(*c*).

FIG. 7(*b*) shows an example of a control information structure for the localized-mode UE. The localized-mode UE can sufficiently receive data using only the RB information, such that it can receive data without using additional information.

FIG. 7(*c*) shows an example of a control information structure for the distributed-mode UE. If the UE is indicative of the distributed-mode UE, FIG. 7(*c*) shows not only the RB information but also the multiplexing of the TDM scheme. The distributed-mode UE additionally transmits DSI information for indicating orthogonal distributed-allocation pattern when resources are distributed and allocated to the time axis.

Figure 8:
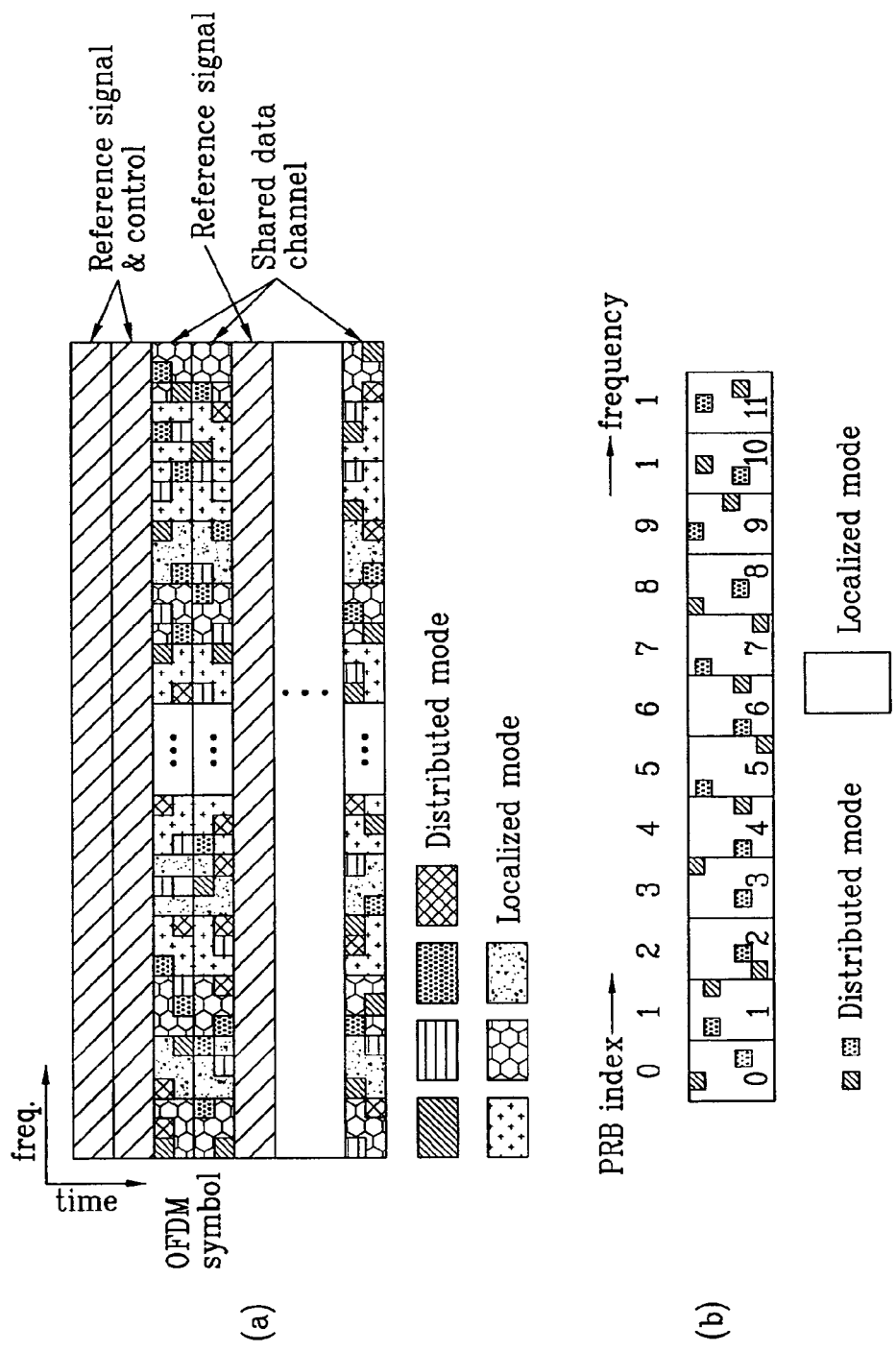
FIG. 8 is a conceptual diagram illustrating a data transmission method based on SC-level distribution modes of a frequency division multiplexing (FDM) scheme according to the present invention.

FIG. 8 is a conceptual diagram illustrating a data transmission method based on SC-level distribution modes of a frequency division multiplexing (FDM) scheme according to the present invention.

FIG. 8(*a*) exemplarily shows the SC-level distributed-mode transmission scheme for a single TTI on the assumption that the number of all the distributed-mode UEs is 4. In the distributed-mode UE's data in the SC-level transmission, a single RB is not used for the distributed mode in the same manner as in the RB-level transmission, the localized-mode UE's data is punctured, and the distributed-mode UE's data is inserted into the puncturing location in units of a sub-carrier.

FIG. 8(*b*) exemplarily shows the SC-level multiplexing scheme for a single OFDM symbol on the assumption that the number of all the distributed-mode UEs is 2. Although FIG. 8(*b*) shows another puncturing pattern different from that of FIG. 8(*a*), it should be noted that the localized-mode UE's data is punctured and the distributed-mode UE's data is inserted into the puncturing location in units of a sub-carrier, in the same manner as in FIG. 8(*a*).

Referring to FIGS. 8(*a*) and 8(*b*), it can be recognized that the SC-level multiplexing is exemplarily performed under the distributed mode. The SC-level multiplexing method does not discriminate between the localized-mode RB and the distributed-mode RB, and is used as a localized mode for shared data channel of all RBs. According to the SC-level multiplexing method, data is punctured in each localized-mode RB, and the resultant data is inserted into the puncturing location.

In order to decide the sub-carrier location at which the distributed-mode UE's data is inserted, the present invention is able to use a method for generating a predetermined puncturing pattern. In order to decide the sub-carrier location at which the distributed-mode UE's data is inserted, a method for generating a predetermined puncturing pattern will hereinafter be described with reference to FIG. 9.

Figure 9:
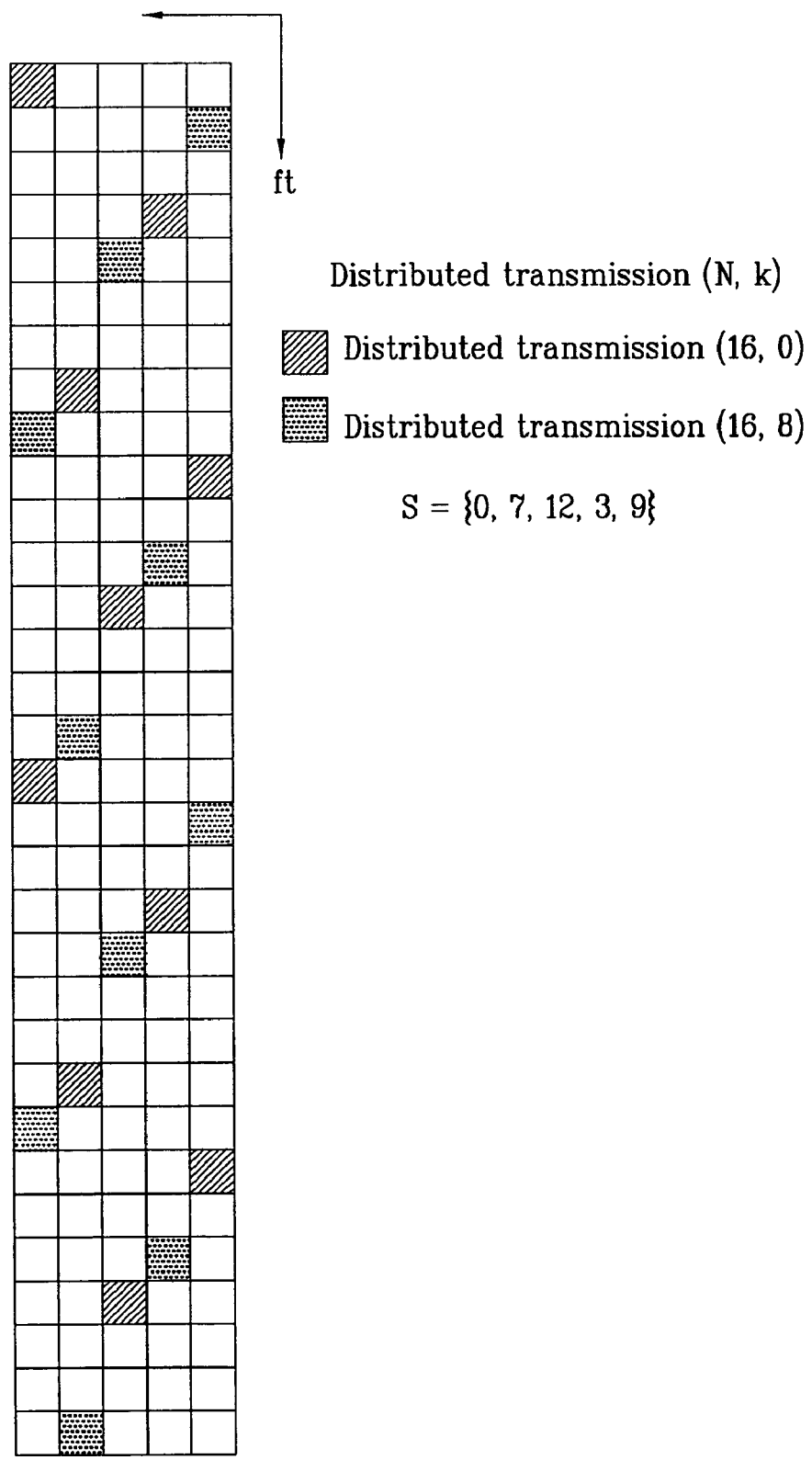
FIG. 9 is a conceptual diagram illustrating a control-information transmission method based on SC-level distribution modes of a frequency division multiplexing (FDM) scheme according to the present invention.

FIG. 9 is a conceptual diagram illustrating a control-information transmission method based on SC-level distribution modes of a frequency division multiplexing (FDM) scheme according to the present invention.

As described above, when the predetermined puncturing pattern is generated to decide the sub-carrier location at which the distributed-mode UE's data is inserted, all the available sub-carriers (i.e., T number of sub-carriers) of the frequency axis in a single OFDM symbol can be divided into N number of groups. In this case, each group is composed of T/N number of sub-carriers which are spaced apart from at regular intervals. Each of the N groups includes group indexes (k) of 0~N−1. By this group index (k), the total number N(N,k) of groups, and a cell-specified sequence (S), the following puncturing pattern of Equation 1 may be generated.

$$\{si+k, si+(k+N) \bmod T, si+(k+2*N) \bmod T, \ldots, si+(k+((T/N)-1*N) \bmod T\} \quad \text{[Equation 1]}$$

Individual elements of Equation 1 indicate the sub-carrier index contained in a single OFDM symbol. The index of 0 is allocated to a first sub-carrier, other indexes which sequentially increase by a predetermined value of 1, such that an index of (T−1) is allocated to the last sub-carrier (i.e., a T-th sub-carrier). In this case, a cell-specified sequence (S) may be denoted by {s0, s1, . . . , sM}. Individual elements of the cell-specified sequence (S) may be denoted by $si (0 \leq i \leq M)$. In this case, M is the number of OFDM symbols contained in a single scheduling unit, and is indicative of broadcast information within a cell. M is not equal to Tx information contained in control information Referring to FIG. 9, the number of available sub-carriers on the frequency axis is 32, and 32 sub-carriers are grouped into 16 groups (i.e., T=32, N=16). In other words, two sub-carriers spaced apart from each other by a predetermined distance construct a single group. And, it is assumed that the cell-specified sequence (S) is denoted by {0, 7, 12, 3, 9}.

In the case of the sub-carrier group of k=0, according to Equation 1, sub-carriers {0, 16}{7, 23}{12, 28}{3, 19}{9, 25} on the basis of a first OFDM symbol from the left side are used to transmit the distributed-mode UE's data. In the case of the sub-carrier group of k=0, according to Equation 1, sub-carriers {8, 24}{15, 31}{20, 4}{11, 27}{17, 1} on the basis of a first OFDM symbol from the left side are used to transmit the distributed-mode UE's data. By the above-mentioned puncturing pattern generation method, the present invention can perform puncturing to acquire resources capable of transmitting data of at least one distributed-mode UE.

Besides the above-mentioned method, the present invention may use an orthogonal random sequence, which has been generated by the UE's ID, as the puncturing pattern.

The structures of FIGS. 3, 6, and 8 have an object to explain the SC-level distributed-mode transmission method. It should be noted that the above structures of FIGS. 3, 6 and 8 may be different from an actual or real system as necessary.

FIG. 10 is a structural diagram of control information according to another embodiment of the present invention.

FIG. 10(*a*) shows a general control information structure, on the condition that the distributed-mode transmission resources are multiplexed according to the SC-level scheme and control information of each UE is transmitted according to the separate-coding scheme.

As can be seen from FIG. 10(a), control information includes indicator information of 1 bit indicating whether the UE is in the localized mode (L) or the distributed mode (D), AD information indicating a transmission period of the UE's control information, RA information indicating which one of resources is used to transmit the UE's data, and puncturing-pattern information for transmitting the localized-mode UE's data. For example, if the puncturing pattern is generated by the method of FIG. 9 and is then used, the above-mentioned control information includes information of a variable N, information indicating N number of group-indexes (k) having the values of 0~N−1, second category (Cat.2) information related to the transmission format of Table 1, third category (Cat.3) information related to HARQ, and CRC information by which the Rx UE can determine whether control information has been correctly received.

The control information structure of FIG. 10(a) has been disclosed for only illustrative purposes. In the same manner as in the above TDM and FDM schemes, individual control information transmitted to the localized-mode UE and the distributed-mode UE can be configured independent of each other, and a detailed description thereof will hereinafter be described with reference to FIGS. 10(b) and 10(c).

FIG. 10(b) exemplarily shows a control information structure transmitted to the distributed-mode UE. FIG. 10(b) shows that control information of each UE is transmitted according to the separate-coding scheme, such that there is no need to transmit identifiers IDs of individual UEs independent of each other. The UE receiving the control information checks an ID which has been indirectly transmitted by the CRC masking method, such that it can determine whether the received control information belongs to the UE itself.

If the UE receives its own control information from the Node-B, it can determine whether its own data transmission mode is the localized mode or the distributed mode using the 1-bit indicator of L or D. In this case, the above-mentioned control information is determined to be control information associated with the distributed-mode UE, such that it may include the indicator information (D). As can be seen from FIGS. 10B and 10(c), a structure or length of control information is changed according to UE's transmission (Tx) modes as shown in FIGS. 10(b)-10(c), such that it is preferable that the indicator information indicating transmission-mode information of the above UE be initially transmitted.

As a result, the present invention can effectively receive control information and can effectively perform the decoding process. And, the UE checks the received AD information, such that it can recognize how many TTIs are used to transmit the UE's control information.

The distributed-mode UE's data performs puncturing of the localized-mode UE's data, and transmits its own Data to the puncturing location, such that the distributed-mode UE can receive data although there is no RA information associated with data allocation in the first category (Cat.1). However, it is preferable that a specific puncturing pattern is used when the localized-mode UE's data is punctured, and puncturing-pattern information is then transmitted.

For example, in the case of using the puncturing pattern generation method of FIG. 9, the present invention requires information of the number (N) of all groups as a necessary parameter. In this case, the number (N) of all groups indicates the number of division groups of sub-carriers available for a single OFDM symbol. The present invention must recognize the number of all groups, such that it can recognize how many sub-carriers have been contained in a single group.

In the case of using the puncturing-pattern generation method of FIG. 9, the present invention requires group index information (k) as a necessary parameter. Based on the group index information (k), the UE can recognize a puncturing pattern which has been used to allocate the UE's data. If the distributed-mode data is multiplexed according to the SC-level scheme, the first category (Cat.1) information of the distributed-mode UEs includes the above-mentioned parameters N and k in order to perform the correct decoding, or it is preferable that the above-mentioned parameters N and k must be transmitted at a time earlier than a Tx time of the second- and third-category (Cat.2) or (Cat.3) information.

The UE receives control information associated with the transmission format contained in the second category (Cat.2), such that it can recognize information of a multi-antenna structure related to the UE's data, information of a modulation method, and a payload size. Upon receiving the control information contained in the third category (Cat.3), the UE can recognize HARQ-associated information. And, the above UE checks Tx CRC information, and determines the presence or absence of any error in the received control information on the basis of the checked Tx CRC information.

FIG. 10(c) shows a control information structure transmitted to the localized-mode UE.

In the case of the localized-mode UE, its own data has been punctured by data of the distributed-mode UE. So, the localized-mode UE must recognize the puncturing patterns of all the distributed-mode UEs in order to decode the above UE's data, such that it can receive correct data. Compared with FIG. 10(b) illustrating control information transmitted to the distributed-mode UE, FIG. 10(c) shows that information of data Tx resources is transmitted and the puncturing-pattern information of all the distributed-mode UEs is transmitted, differently from FIG. 10(b).

In other words, in the case of control information transmitted to the localized-mode UE, the present invention transmits indicator information indicating that corresponding control information is the localized-mode UE's control information, but the above control information transmitted to the localized-mode UE may further include L information indicating the localized mode. And, the AD information is transmitted in the same manner as in control information of the distributed-mode UE.

In order to recognize data Tx resources, the localized-mode UE must transmit RA information associated with data allocation of the RB unit via which data of a corresponding UE is transmitted, differently from the distributed-mode UE's control information of FIG. 10(b).

As a result, the localized-mode UE can recognize which one of resources is used to transmit the UE's data. The localized-mode UE must recognize data which has been puncturing-processed by the distributed-mode UE for data allocation, so that it can recognize the location of the UE's data and can perform the decoding.

Therefore, the localized-mode UE must recognize not only its own RN information but also parameters used when the distributed-mode UE generates the puncturing pattern, such that it can correctly recover its own data on the basis of the recognized information. Namely, in the case of using the puncturing-pattern generation method of FIG. 9, it is preferable that the "N" and "k" parameters (N=the number of all groups and k=group index information) be contained in the control information of the localized-mode UE.

If the group index (k) and the distributed-mode UE are decided, the distributed-mode UE can receive its own data although only the group index information of the puncturing pattern which has been used for a corresponding UE is transmitted. However, in the case of the localized-mode UE, although group index information of the puncturing patterns of all the distributed-mode UEs contained in the TTI is transmitted, the localized-mode UE can receive correct data. Namely, $k_1, k_2, \ldots, k_{DUE}$ of FIG. 10C indicate the sub-carrier (SC) group index used by individual UEs.

The second category (Cat.2), the third category (Cat.3), and CRC information of FIG. 10C are equal to those of FIG. 10B.

FIG. 11 is a structural diagram of control information according to another embodiment of the present invention.

Specifically, exemplary control information structures of FIG. 11 are related to a specific case in which the puncturing-pattern generation method of FIG. 9 is not used. In FIG. 9, all the sub-carriers available for a single OFDM symbol are grouped into N number of groups. The control information structures of FIG. 11 generate the puncturing pattern using three parameters N, k and S. N is the number of all groups contained in the single OFDM symbol, the group index (k), and a cell-specified sequence (S) is broadcast to the entire cell.

However, this embodiment does not use the above-mentioned puncturing-pattern generation method of FIG. 9, and generates an orthogonal puncturing pattern using a random sequence generated by the UE's ID. According to the separate-coding scheme, the Node-B and the UE have already recognized the UE's although the UE's ID is not directly communicated between the Node-B and the UE so as to implement the bandwidth efficiency. Therefore, this embodiment can generate the random sequence using a corresponding UE's ID shared by the Node-B and the UE.

In other words, if the puncturing pattern is generated by the above-mentioned random-sequence generation method based on the UE's ID so as to transmit the distributed-mode UE's data, there is no need to transmit the N and k parameters (N=the number of all groups and k=group index) as shown in FIGS. 11(a) and 11(b), such that an amount of overhead of control information is reduced.

FIG. 11(a) shows an exemplary control information structure capable of being applied to both the localized-mode UE and the distributed-mode UE. FIG. 11(b) shows a control information structure capable of being applied to the distributed-mode UE, and FIG. 11(c) shows a control information structure capable of being applied to the localized-mode UE.

The distributed-mode UE receiving the control information of FIG. 11(b) acquires information of a puncturing pattern used for data transmission on the basis of the distributed-mode UE's ID information, and can receive data using the acquired puncturing-pattern information. The localized-mode UE receiving the control information of FIG. 11(c) acquires puncturing information of the localized-mode UE's data on the basis of the distributed-mode UE's ID information, and can receive data using the acquired information. In this case, for the convenience of description, it is assumed that the localized-mode UE has recognized ID information of the distributed-mode UEs.

Figures 12, 13:
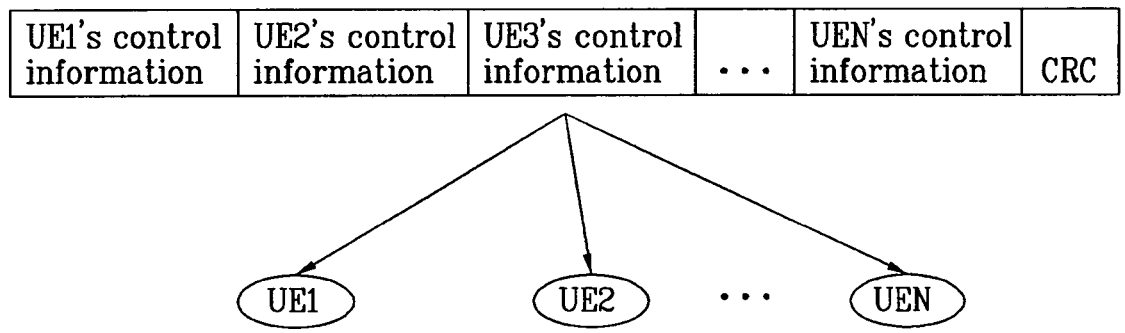
FIG. 12 is a structural diagram of control information according to another embodiment of the present invention.
FIG. 13 is a conceptual diagram illustrating a joint-coding scheme according to the present invention.

FIG. 12 is a structural diagram of control information according to another embodiment of the present invention.

The random sequence is generated by the UE's ID information shown in FIG. 11.

If the embodiment of FIG. 12 has difficulty in generating orthogonal puncturing patterns as many as the number of all the distributed-mode UEs, the embodiment of FIG. 12 may select the puncturing pattern from the orthogonal hopping pattern set well known to both the Node-B and each UE. In the case of using the orthogonal hopping pattern set, the embodiment of FIG. 12 includes index information associated with the selected puncturing pattern in the control information, so that it can indicate the puncturing pattern using the resultant control information.

FIG. 12(a) shows a control information structure capable of being applied to both the localized-mode UE and the distributed-mode UE. FIG. 12(b) shows a control information structure capable of being applied to the distributed-mode UE, and FIG. 12(c) shows a control information structure capable of being applied to the localized-mode UE.

The distributed-mode UE receiving the control information of FIG. 12(b) can acquire information associated with the puncturing pattern, which has been used for transmitting the distributed-mode UE's data, on the basis of "S.I" information. In other words, "S.I" information is indicative of index information associated with the puncturing pattern selected from the above-mentioned examples, and the distributed-mode UE can receive data via the above-mentioned index information associated with the puncturing pattern.

The localized-mode UE receiving control information of FIG. 12(c) receives DSI information, such that it may indicate the puncturing pattern information selected from the orthogonal hopping pattern set. In this case, when the above-mentioned TDM scheme is used, the DSI information is index information indicating which one of puncturing patterns from among the orthogonal hopping pattern set will be used as a puncturing pattern of a first distributed-mode UE.

The distributed-mode UE must pre-recognize which one of indexes from among the orthogonal hopping pattern set is associated with the distributed-mode UE's puncturing pattern. If the distributed-mode UE recognizes the above-mentioned index, it can receive data.

However, in order to receive or decode the localized-mode UE's data, the localized-mode UE must pre-recognize the puncturing patterns of all the distributed-mode UEs of a corresponding TTI, such that the localized-mode UE can decode the localized-mode UE's data upon receiving both the number ($N_{DUE}$) of all the distributed-mode UEs and an index (DSI) of the puncturing pattern used by a first distributed-mode UE.

In this case, if the puncturing pattern of the first distributed-mode UE is determined, it is assumed that the puncturing pattern contained in the orthogonal hopping pattern set is determined to be the range from the first distributed-mode UE to the last distributed-mode UE.

In other words, the localized-mode UE can recognize the puncturing pattern of the first distributed-mode UE from among all the distributed-mode UEs on the basis of the DSI information, and puncturing patterns as many as the number ($N_{DUE}$) of all the distributed-mode UEs are used in the above-mentioned orthogonal hopping pattern set.

In this case, the above-mentioned puncturing patterns from a puncturing pattern corresponding to the DSI information are sequentially used. As a result, the present invention can recognize the puncturing patterns of all the distributed-mode UEs, and can receive correct data.

As described above, according to the above method for constructing the control information, the present invention can support the method for multiplexing the distributed-mode UE's data and transmitting the multiplexed data. Based on indicator information contained in the control information, each UE can determine whether its own data is transmitted under the localized mode or the distributed mode. Each UE uses the 1-bit indicator of L or D, so that it can effectively reduce an amount of overhead of control information of the localized-mode UE.

The DUE order information indicates which one of $N_D$ sub-blocks contained in the distributed-mode RB divided into $N_D$ number of parts receives data during the RB-level multiplexing time. Since the DUE order information is located in front of the RA field, a corresponding UE can pre-recognize which one of sub-blocks contained in a corresponding RB receive the UE's data, such that the data can be correctly decoded.

The DUE order information is located in front of the RA field, such that a data allocation processing time can be greatly reduced. Preferably, due to the above-mentioned DUE order information, $N_D$ information may be transmitted earlier than the RA field.

If the puncturing pattern is generated according to the above method of FIG. 9, N and k parameters are required to allocate the distributed-mode UE's data. Therefore, the distributed-mode UE includes the N and k parameters associated with the puncturing pattern, such that it can receive data of the distributed-mode UE. The localized-mode UE can recognize the puncturing location of its own data on the basis of N, k1, k2, . . . , $k_{DUE}$, such that it can decode its own data without any errors.

FIG. 13 is a conceptual diagram illustrating a joint-coding scheme according to the present invention.

Referring to FIG. 13, if control information based on the joint-coding scheme includes control information of at least one UE. In other words, all or some parts of control information of at least one UE are configured in the form of a single message, so that this message is transmitted to the at least one UE. In this case, a single channel-encoding process associated with the Tx control information is performed, and only a single CRC is added to a total message. In the case of using the joint-coding scheme, each UE performs the decoding of a predetermined control channel, thereby acquiring its own control information and control information of other UEs. And, each UE can check its own control information using its own ID from among all the UEs' control information received from the Node-B.

FIG. 14 shows an example of the joint-coding scheme according to the present invention.

FIG. 14 shows exemplary control information based on the joint-coding scheme shown in FIG. 13. In more detail, FIG. 14(a) shows control information acquired when the joint-coding scheme is applied to first category (Cat.1) control information of N number of UEs. In other words, ID information from the first UE to the N-th UE and the above-mentioned AD information are sequentially contained in the control information of FIG. 14(a), and then the control information further includes RA information from the first UE to the N-th UE. Namely, the RA information of each UE is transmitted after the ID and AD information of each UE has been transmitted.

FIGS. 14(b) and 14(c) show the first category information and the second/third category information.

Referring to FIG. 14(b), first to third category information of the first UE is transmitted, and then first to third category information of the second UE are transmitted. Finally, first to third category information of the N-th UE are transmitted.

Referring to FIG. 14(c), first category information of the first to N-th UEs is transmitted, first category information of the first to N-th UEs is transmitted, and second and third category information are finally transmitted.

FIG. 14 shows only the examples of control information. Provided that control information of several UEs is transmitted via a single message, the control information may be configured in various ways other than the method of FIG. 14. Although the control information of FIG. 14 does not have the CRC information, it should be noted that control information of several UEs is configured in the form of a single message and a single CRC is added to the resultant message.

Each UE receives control information, and checks an ID part of the first category (Cat.1), such that it recognizes which control information has been allocated to the UE itself on the basis of the ID part. As a result, each UE can recognize the above control information, such that it can recognize which one of resources has the UE's data, information of a modulation method, and information of an HARQ execution method.

Figure 15:
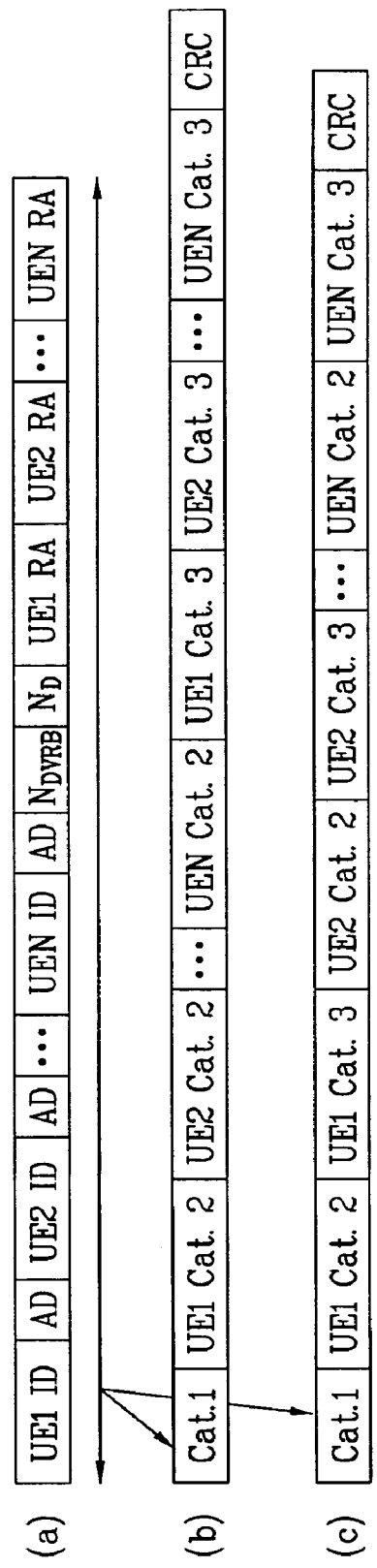
FIG. 15 is a structural diagram of control information according to another embodiment of the present invention.

FIG. 15 is a structural diagram of control information according to another embodiment of the present invention.

Referring to FIG. 15, as previously stated in FIG. 3, control information is transmitted under the FDM-based RB-level distributed mode if a current mode is the distributed mode. If the FDM scheme is used, the control information is configured according to the joint-coding scheme.

A predetermined RB to which the distributed mode is applied is divided into a predetermined number of sub-blocks corresponding to a predetermined number of sub-carriers to perform the multiplexing of channels of several UEs. In order to indicate the number of sub-blocks contained in a single distributed-mode RB, the $N_D$ parameter is used. In other words, as shown in FIG. 15, $N_D$ is the number of sub-carrier (SC) groups (i.e., the number of sub-blocks) contained in a single distributed-mode RB, such that the each distributed-mode UE's data can be allocated to each of $N_D$ sub-blocks. And, $N_{DVRB}$ of FIG. 15 is the number of distributed-mode UEs.

FIG. 15(a) shows the first-category control information shown in Table 1. If the distributed-mode UE is multiplexed according to the FDM scheme of FIG. 3, and each UE's control information is transmitted according to the RB-level distributed-mode transmission scheme and the joint-coding scheme, FIG. 15(a) exemplarily shows the first category control information shown in Table 1.

As can be seen from FIG. 16(a), control information includes AD information, RA information, $N_{DVRB}$ information, and $N_D$ information. The AD information indicates an ID of each UE and assignment duration (AD). The RA information indicates which one of resources includes the UE's data. $N_{DVRB}$ information indicates the number of distributed-mode UEs from among the simultaneously-multiplexed UEs. $N_D$ information indicates the number of blocks divided by a single distributed-mode RB.

The UE receiving control information of FIG. 15 checks its own ID by referring to the ID field of each UE, and checks Tx resources of control information, such that it can receive the control information. In this case, the localized-mode UE can receive control information on the condition that it acquires the RB information from the RA field.

However, although the distributed-mode UE acquires the distributed-mode RB information from the RA field, it can share a corresponding RB with one or more other distributed-mode UEs. As a result, provided that the distributed-mode UE acquires the above-mentioned sub-block information, it can more correctly receive control information. According to this embodiment of the present invention, the localized-mode UE checks a total number of localized-mode UEs by referring to the $N_{DVRB}$ field, and recognizes the number of sub-blocks divided by a single distributed-mode RB by referring to the $N_D$ field.

If the number of distributed-mode UEs is equal to the number of sub-blocks, the present invention checks the order of a corresponding distributed-mode UE in all the distributed-mode UEs, and can receive control information of the above UE using the sub-block corresponding to the checked order.

In other words, provided that three distributed-mode UEs exist and a single RB includes three sub-blocks, a first distributed-mode UE can receive control information via the first sub-block. In this way, a second distributed-mode UE can receive control information via the second sub-block, and a third distributed-mode UE can receive control information via the third sub-block.

If the number of distributed-mode UEs is different from the number of sub-blocks, the present invention checks the order of a corresponding distributed-mode UE in all the distributed-mode UEs in a similar way to the above-mentioned separate-coding scheme, performs the modulo-operation on the checked result using the number of sub-blocks, and receives control information via the above order-associated subblock.

According to control information based on the joint-coding scheme, control information of all the UEs is configured at a time, and control information of other UEs can be received, differently from the separate-coding scheme. The remaining parts other than the above-mentioned operations of the control information based on the joint-coding scheme are equal to those of the control information based on the separate-coding scheme.

FIGS. 15(b) and 15(c) show control information which includes the first category information and the second/third category information. According to the joint-coding scheme of FIGS. 15(b) and 15(c), control information of all the distributed-mode UEs and control information of all the localized-mode UEs are integrated into a single structure, CRC information is not added to each UE, but only one CRC information is added to total control information, differently from the separate-coding scheme.

As shown in FIG. 15(b), the first category information of all UEs is firstly transmitted, and then control information is sequentially transmitted according to the order of categories. In brief, the first category information of all the UEs is transmitted, the second category information of all the UEs is transmitted, and the third category information of all the UEs is finally transmitted.

As shown in FIG. 15(c), the first category information of all the UEs is transmitted in the same manner as in FIG. 5(b), but control information is then transmitted according to the order of individual UEs in a different way from FIG. 5(b). In other words, the first category information of all the UEs is transmitted, control information (e.g., second and third category information of the first UE) of the first UE is transmitted, and control information (e.g., second and third category information of the second UE) of the second UE is then transmitted. In this way, control information (e.g., second- and third-category control information of the last UE (N)) of the third UE is finally transmitted.

Figure 16:
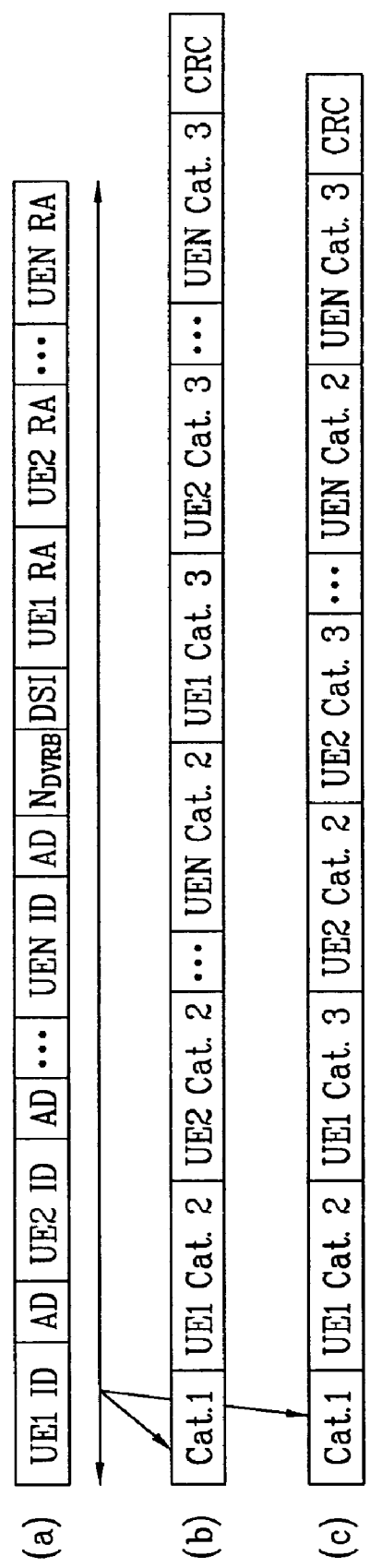
FIG. 16 is a structural diagram of control information according to another embodiment of the present invention.

FIG. 16 is a structural diagram of control information according to another embodiment of the present invention.

Referring to FIG. 16, as previously stated in FIG. 6, control information is transmitted under the TDM-based RB-level distributed mode if a current mode is the distributed mode. If the FDM scheme is used, the control information is configured according to the joint-coding scheme.

Resources are distributed and allocated to the time axis of the distributed-mode UE. In this case, the resources may be distributed to have a predetermined pattern. In this case, a single pattern is selected from the orthogonal hopping pattern set well known to the Node-B and the UE, such that the selected pattern can be used as the distributed-allocation pattern. In other words, it is preferable that information of the distributed-allocation pattern used by the distributed-mode UE may be transmitted.

FIG. 16(a) shows the first-category information shown in Table 1. If the distributed-mode UE is multiplexed according to the RB-level TDM scheme of FIG. 6, and each UE's control information is transmitted according to the joint-coding scheme, FIG. 16(a) exemplarily shows the first category information shown in Table 1.

As can be seen from FIG. 16(a), ID- and AD-information of the first to the N-th UEs are transmitted, $N_{DVRB}$ information indicating the total number of distributed-mode UEs and DSI information are transmitted, and the RA information of each UE is transmitted. In this case, if resources are distributed and allocated to the time axis, DSI information is used to indicate the selected distributed-allocation pattern. For example, if a singe pattern is selected from the orthogonal hopping pattern set well known to the Node-B and the UE, the DSI information may indicate the selected orthogonal hopping pattern.

Each UE receives control information of FIG. 16, checks its own ID by referring to its own ID field, and checks Tx resources of control information, such that it can receive control information. In this case, the localized-mode UE can receive control information on the condition that it acquires RB information from the RA field. However, although the distributed-mode UE acquires the distributed-mode RB information from the RA field, it can share a corresponding RB with one or more other distributed-mode UEs. As a result, provided that the distributed-mode UE acquires the above-mentioned sub-block information, it can more correctly receive control information.

According to this embodiment of the present invention, the localized-mode UE checks a total number of localized-mode UEs by referring to the $N_{DVRB}$ field, and recognizes which one of distributed-allocation patterns has been used by referring to information of the DSI field.

In this case, the DSI field may indicate all information of distributed-allocation patterns of individual UEs. And, the DSI field may indicate a distributed-allocation pattern of a reference UE (e.g., a first UE) from among all the distributed-mode UEs. In other words, another distributed-mode UE checks the order of the above distributed-mode UE itself in all the distributed-mode mode UEs, such that it estimates index information of the distributed-allocation pattern used by the distributed-mode UE itself.

Namely, the present invention sequentially increases index information of the distributed-allocation pattern by one, such that it can estimate/check its own distributed-allocation pattern. The above index information of the distributed-allocation pattern has been used by a first distributed-mode UE from among the distributed-allocation pattern set.

FIGS. 16(b) and 16(c) show control information which includes the first category information and the second/third category information. According to the joint-coding scheme of FIGS. 15(b) and 15(c), control information of all the multiplexed UEs is integrated into a single structure, CRC information is not added to each UE, but only one CRC information is added to total control information, differently from the separate-coding scheme. It should be noted that FIGS. 16(b) and 16(c) are equal to FIGS. 15(b) and 15(c).

Figure 17:
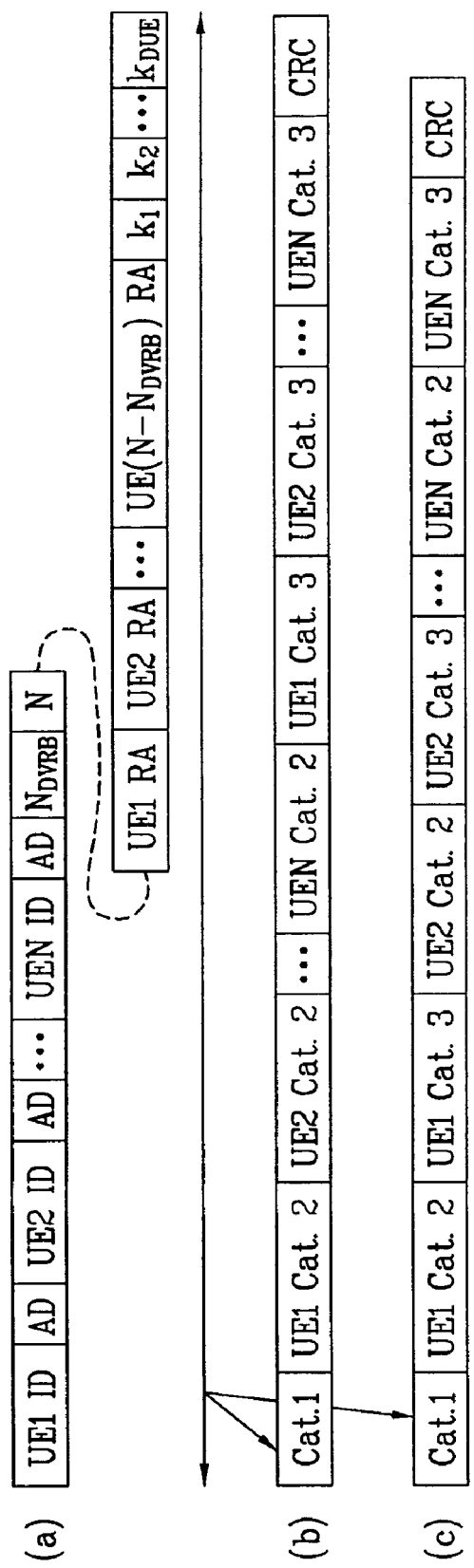
FIG. 17 is a structural diagram of control information according to another embodiment of the present invention.

FIG. 17 is a structural diagram of control information according to another embodiment of the present invention.

If the distributed-mode Tx resources of FIG. 9 are transmitted according to the SC-level scheme and each UE's control information is transmitted according to the joint-coding scheme, the control information of FIG. 17 is made.

If the resources are transmitted according to the SC-level scheme, the localized-mode UE uses all the RBs for data transmission, and the distributed-mode UE uses some parts of the above RBs via resources puncturing-processed by a specific puncturing pattern. In other words, it is preferable that information of each puncturing pattern for generating resources used by each distributed-mode UE may be transmitted via the control information.

FIG. 17(a) shows the first category information shown in Table 1. If the distributed-mode UE is multiplexed according to the SC-level multiplexing scheme of FIG. 8, and each UE's control information is transmitted according to the joint-coding scheme, FIG. 17(a) exemplarily shows the first category information shown in Table 1.

As can be seen from FIG. 17(a), ID- and AD-information of the first to the N-th UEs are transmitted, $N_{DVRB}$ information indicating the total number of distributed-mode UEs and N information indicating the total number of sub-carriers are transmitted, and the RA information of each UE is transmitted. In this case, the distributed-mode UE does not receive the RA information, but uses the puncturing resources contained in the localized-mode RB, such that the RB information (i.e., RA information) of the localized-mode UE may be transmitted. Finally, "k" information of each distributed-mode UE is transmitted. In this case, "k" is the N number of group-indexes having the value of 0~N−1.

Each UE receives control information of FIG. 17, checks its own ID by referring to its own ID field, and checks Tx resources of control information, such that it can receive control information. In this case, the distributed-mode UE recognizes $N_{DVRB}$ information indicating the total number of distributed-mode UEs, N information indicating the total number of sub-carriers, and k information indicating a group-index of the distributed-mode UE itself, such that it acquires the puncturing-pattern information and receives data. The localized-mode UE acquires RB information from the RA field and the puncturing-pattern information of all the UEs upon receiving $N_{DVRB}$ information, N information, and $k_1 \ldots k_{DUE}$ information, such that it can receive control information using the acquired information.

FIGS. 17(b) and 17(c) show control information which includes the first category information and the second/third category information. According to the joint-coding scheme of FIGS. 18(b) and 18(c), control information of all the distributed-mode UEs and control information of all the localized-mode UEs are integrated into a single structure, CRC information is not added to each UE, but only one CRC information is added to total control information, differently from the separate-coding scheme. It should be noted that FIGS. 17(b) and 17(c) are equal to FIGS. 15(b) and 15(c).

Figure 18:
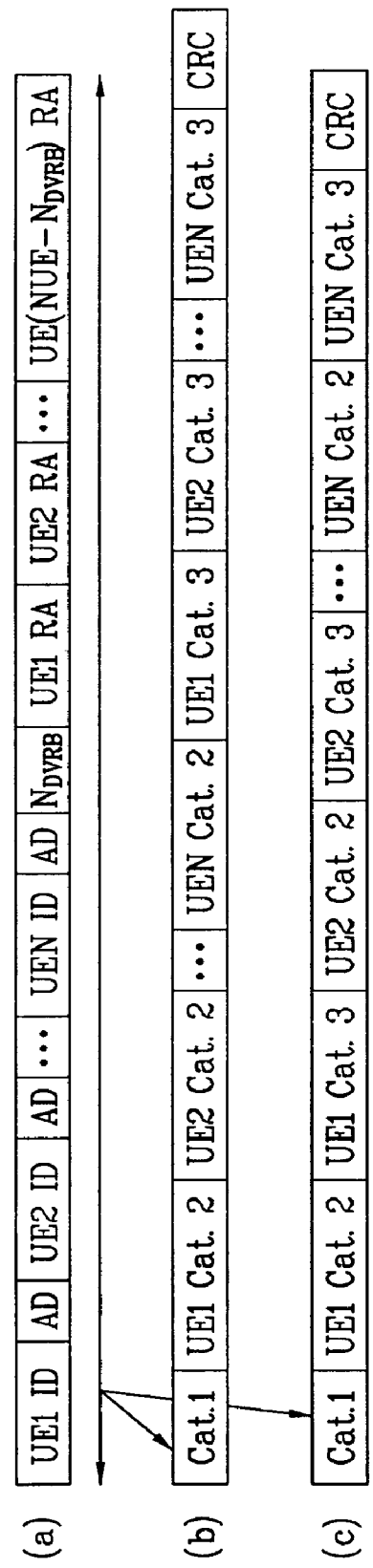
FIG. 18 is a structural diagram of control information according to another embodiment of the present invention.

FIG. 18 is a structural diagram of control information according to another embodiment of the present invention.

FIG. 18 shows exemplary control information. If the distributed-mode Tx resources are multiplexed according to the SC-level scheme, and each UE's control information is transmitted according to the joint-coding scheme, FIG. 18 exemplarily shows a method for constructing control information when the puncturing-pattern generation method of FIG. 9 is not used.

In this case, the present invention generates the random sequence using the UE's ID according to the separate-coding scheme as previously stated in FIG. 11, such that the random sequence is used as the puncturing pattern of each distributed-mode UE. In this case, it is preferable that individual puncturing patterns may have orthogonality therebetween.

As can be seen from FIG. 18(a), ID- and AD-information of the first to the N-th UEs are transmitted, information indicating the total number of distributed-mode UEs is transmitted, and the RA information of each UE is transmitted. In this case, although only RA information associated with the localized-mode UE is transmitted, the above RA information indicating the UE's resource allocation information enables both the localized-mode UE and the distributed-mode UE to receive data.

According to this embodiment based on the joint-coding scheme, ID information of each UE is transmitted, such that each distributed-mode UE checks its own ID and can recognize the puncturing-pattern information via the random sequence generated by the ID. The localized-mode UE can check control information of other UEs (i.e., ID information of other UEs) due to the characteristics of the joint-coding scheme, such that it checks ID information of all the distributed-mode UEs, thereby recognizing information of resources punctured by all the distributed-mode UEs.

If the puncturing pattern is generated by the random-sequence generation method based on the above UE's ID information so as to transmit the distributed-mode UE's data, there is no need to transmit N information indicating the total number of groups and k information indicating a group-index, such that an amount of overhead of control information can be reduced.

FIGS. 18(b) and 18(c) show control information which includes the first category information and the second/third category information. According to the joint-coding scheme of FIGS. 18(b) and 18(c), control information of all the distributed-mode UEs and control information of all the localized-mode UEs are integrated into a single structure, CRC information is not added to each UE, but only one CRC information is added to total control information, differently from the separate-coding scheme. It should be noted that FIGS. 18(b) and 18(c) are equal to FIGS. 15(b) and 15(c).

Figure 19:
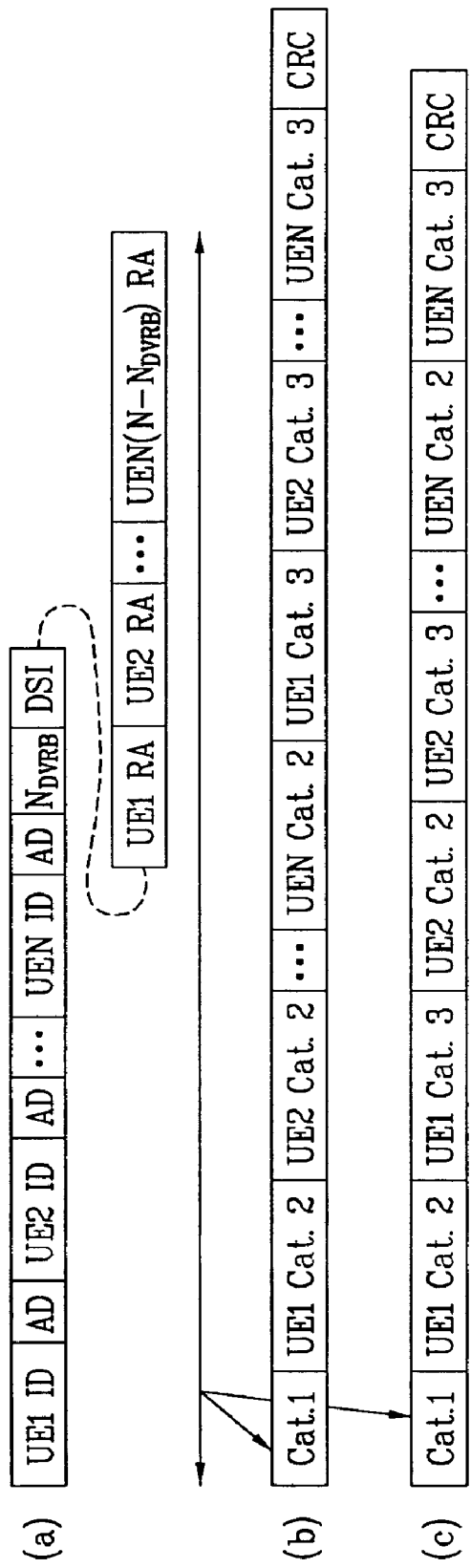
FIG. 19 is a structural diagram of control information according to another embodiment of the present invention.

FIG. 19 is a structural diagram of control information according to another embodiment of the present invention.

FIG. 19 shows exemplary control information. If the distributed-mode Tx resources are multiplexed according to the SC-level scheme, and each UE's control information is transmitted according to the joint-coding scheme, FIG. 19 exemplarily shows a method for constructing control information when the puncturing-pattern generation method of FIG. 9 is not used.

If the embodiment of FIG. 19 has difficulty in generating orthogonal puncturing patterns as many as the number of all the distributed-mode UEs, the embodiment of FIG. 19 may select the puncturing pattern from the orthogonal hopping pattern set well known to both the Node-B and each UE. In the case of using the orthogonal hopping pattern set, the embodiment of FIG. 19 includes index information associated with the selected puncturing pattern in the control information, so that it can indicate the puncturing pattern using the resultant control information.

As can be seen from FIG. 19(a), ID- and AD-information of the first to the N-th UEs are transmitted, $N_{DVRB}$ information indicating the total number of distributed-mode UEs is transmitted, the DSI information indicating index information of the selected puncturing pattern is transmitted, and then RA information of each UE is transmitted. In this case, although only RA information of the localized-mode UE is transmitted, the above RA information indicating the UE's resource allocation information enables both the localized-mode UE and the distributed-mode UE to receive data.

The localized-mode UE receiving control information of FIG. 19 receives DSI information, such that it can recognize the puncturing-pattern information selected from the orthogonal hopping pattern set. In this case, when the above-mentioned TDM scheme is used, the DSI information is index information indicating which one of puncturing patterns from among the orthogonal hopping pattern set will be used as a puncturing pattern of a first distributed-mode UE. If the DSI information of a single reference UE is transmitted, the present invention allows other UEs to use the puncturing pattern corresponding to the index sequentially increasing by one, such that the other UEs can be estimated.

The distributed-mode UE must pre-recognize which one of indexes from among the orthogonal hopping pattern set is associated with the distributed-mode UE's puncturing pattern. If the distributed-mode UE recognizes the above-mentioned index, it can receive data. However, in order to receive or decode the localized-mode UE's data, the localized-mode UE must pre-recognize the puncturing patterns of all the distributed-mode UEs of a corresponding TTI, such that the localized-mode UE can decode the localized-mode UE's data upon receiving both the number ($N_{DVRB}$) of all the distributed-mode UEs and an index (DSI) of the puncturing pattern used by a first distributed-mode UE. In this case, if the puncturing pattern of the first distributed-mode UE is determined, it is assumed that the puncturing pattern contained in the orthogonal hopping pattern set is determined to be the range from the first distributed-mode UE to the last distributed-mode UE.

In other words, the localized-mode UE can recognize the puncturing pattern of the first distributed-mode UE from among all the distributed-mode UEs on the basis of the DSI information, and puncturing patterns as many as the number ($N_{DVRB}$) of all the distributed-mode UEs are used in the above-mentioned orthogonal hopping pattern set. In this case, the above-mentioned puncturing patterns from a puncturing pattern corresponding to the DSI information are sequentially used. As a result, the present invention can recognize the puncturing patterns of all the distributed-mode UEs, and can receive correct data.

By the control information of the above-mentioned embodiment, the distributed-mode UE and the localized-mode UE can be supported. And, $N_D$ and $N_{DVRB}$ are located after the UE's ID field, such that data can be decoded under the FDM-based distribution mode. By $N_{DVRB}$ information, each UE can recognize whether it is a distributed-mode UE or a localized-mode UE, such that the decoding processing time of control information becomes shorter. By $N_D$ information, each UE can recognize which one of sub-blocks contained in the distributed-mode RB includes the UE's data. Therefore, the above-mentioned control information can reduce a decoding error rate of control information.

The TDM-based distributed-mode UE can recognize which one of hopping patterns is contained in its own data, resulting in reduction of a control-information decoding error rate.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied to a mobile communication system, a broadband communication system, and a multi-carrier system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for receiving control information for data reception at a specific user equipment (UE) in a mobile communication system, the method comprising:
   receiving the control information including a first field and a second field, the first field indicating a data transmission mode of the specific UE and the second field indicating a resource block via which the data is transmitted; and
   receiving the data using the control information,
   wherein the mobile communication system uses at least a localized transmission mode or a distributed transmission mode for transmitting data of at least one UE,
   wherein the data is transmitted using at least a resource block (RB)-level frequency division multiplexing (FDM) scheme, a RB-level time division multiplexing (TDM) scheme, or a sub-carrier (SC)-level multiplexing scheme if the data transmission mode for the specific UE is the distributed mode, and
   wherein a distributed-mode resource block (RB) includes at least one sub-block, the control information further includes a third field capable of checking the at least one sub-block, and the data is received using the second and third fields if the data for the specific UE is transmitted according to the RB-level FDM scheme.

2. The method according to claim 1, wherein:
   the data is received using the second field if the data transmission mode for the specific user equipment (UE) is the localized mode.

3. The method according to claim 1, wherein
   the third field includes order information for the specific UE of all UEs in the distributed mode contained in a single transmission unit and
   further comprising confirming the at least one sub-block by using the order information.

4. The method according to claim 1, wherein:
   the control information further includes a fourth field including a distributed-allocation pattern based on a TDM scheme and the data is received using the second and fourth fields if the data for the specific UE is transmitted according to the RB-level TDM scheme.

5. The method according to claim 1, wherein:
   the control information further includes a fourth field including puncturing pattern information used by all UEs in the distributed mode and the data is received using the second and fourth fields if the data for the specific UE is transmitted according to the SC-level multiplexing scheme and the data transmission mode for the specific UE is the localized mode; and
   the control information further includes a fifth field including puncturing pattern information used by the specific UE and the data is received using the second and fifth fields if the data for the specific UE is transmitted according to the SC-level multiplexing scheme and the data transmission mode for the specific UE is the distributed mode.

6. A method for receiving control information for data reception at a specific user equipment (UE) in a communication system which is capable of using at least one data transmission mode to transmit data of at least one UE, the method comprising:

checking a data transmission mode contained in control information that includes a first field indicating the data transmission mode and a second field indicating a resource block via which the data is transmitted;

receiving the data via resource blocks indicated in the control information if the data transmission mode is a localized mode;

receiving the data via resource blocks confirmed by an order of the specific UE among all UEs in the distributed mode and receiving the data using at least a resource block (RB)-level frequency division multiplexing (FDM) scheme, a RB-level time division multiplexing (TDM) scheme, or a sub-carrier (SC)-level multiplexing scheme if the data transmission mode is a distributed mode; and receiving the data using the second field and a third field included in the control information if data for the specific UE is transmitted according to the RB-level TDM scheme, the third field including a distributed-allocation pattern based on a TDM scheme.

7. A method for receiving control information for data reception at a specific user equipment (UE) in a mobile communication system, the method comprising:

receiving the control information;

determining whether a data transmission mode is a localized mode or a distributed mode based on the control information;

receiving data via resource blocks confirmed by puncturing pattern information for all UEs in a distributed mode if the data transmission mode is the localized mode; and receiving data via resource blocks confirmed by puncturing pattern information of the specific UE if the data transmission mode is the distributed mode, wherein the puncturing pattern information includes a total number of groups and a group index for each UE in the distributed mode if a plurality of sub-carriers contained in a single transmission unit are divided into at least one group.

* * * * *